US010796354B1

(12) United States Patent
Termeer

(10) Patent No.: US 10,796,354 B1
(45) Date of Patent: Oct. 6, 2020

(54) APPARATUS AND METHOD FOR DETERMINING THE COLOR OF PAINT ON A VEHICLE

(71) Applicant: Dennis Termeer, Henderson, NV (US)

(72) Inventor: Dennis Termeer, Henderson, NV (US)

(*) Notice: Subject to any disclaimer, the term of this patent is extended or adjusted under 35 U.S.C. 154(b) by 203 days.

(21) Appl. No.: 16/133,997

(22) Filed: Sep. 18, 2018

(51) Int. Cl.
| G06Q 30/00 | (2012.01) |
| G06Q 30/06 | (2012.01) |
| G06Q 20/12 | (2012.01) |
| G06K 9/32 | (2006.01) |
| G06F 3/0482 | (2013.01) |
| G06K 7/14 | (2006.01) |

(52) U.S. Cl.
CPC ......... *G06Q 30/0625* (2013.01); *G06K 9/325* (2013.01); *G06Q 20/12* (2013.01); *G06Q 30/0635* (2013.01); *G06F 3/0482* (2013.01); *G06K 7/1413* (2013.01); *G06K 2209/01* (2013.01)

(58) Field of Classification Search
CPC .................................................. G06Q 30/0625
See application file for complete search history.

(56) References Cited

U.S. PATENT DOCUMENTS

2012/0109660 A1* 5/2012 Xu ..................... G06Q 30/0283
                                                                    705/1.1
2014/0270385 A1* 9/2014 Nepomniachtchi .. G06K 9/4652
                                                                    382/104

OTHER PUBLICATIONS

Souza, L. R. S., R. M. M. Oliveira, and M. H. Stoppa. "Proposal of Automated Inspection Using Camera in Process of VIN Validation." Multibody Mechatronic Systems. Springer, Cham, 2015. 285-293.*

* cited by examiner

Primary Examiner — Kathleen Palavecino
(74) Attorney, Agent, or Firm — Eric N. Kohli

(57) ABSTRACT

A method and apparatus for determining the color of paint on a vehicle whereby a user may buy corresponding products. An image of a vehicle's identification (VIL) label is captured and transferred to an application on a computer device. An optical recognition procedure is performed on the image to determine the vehicle's vehicle identification (VIN) number. The vehicle's manufacture information helps determine the location of a paint code zone on the VIL label. A zonal optical recognition procedure is performed on the VIL label to extract a paint code from the paint code zone. Alternatively, a list of colors in which the particular vehicle was manufactured is determined based on the vehicle's manufacture information. The user may select the color of his vehicle from the list to identify the correct color. The user may selectively purchase products corresponding to the determined color of paint.

20 Claims, 14 Drawing Sheets

| L | 1990 | Y | 2000 | A | 2010 |
|---|---|---|---|---|---|
| M | 1991 | 1 | 2001 | B | 2011 |
| N | 1992 | 2 | 2002 | C | 2012 |
| P | 1993 | 3 | 2003 | D | 2013 |
| R | 1994 | 4 | 2004 | E | 2014 |
| S | 1995 | 5 | 2005 | F | 2015 |
| T | 1996 | 6 | 2006 | G | 2016 |
| V | 1997 | 7 | 2007 | H | 2017 |
| W | 1998 | 8 | 2008 | J | 2018 |
| X | 1999 | 9 | 2009 | K | 2019 |

APPARATUS AND METHOD FOR DETERMINING THE COLOR OF PAINT ON A VEHICLE

FIELD OF THE INVENTION

This invention concerns paint on vehicles and, more specifically, to determining the color of paint on a vehicle and selling associated products.

BACKGROUND

Vehicles and automobiles are a routine and essential component of everyday life across the world. That includes vehicles for personal use and for commercial use. Vehicles come in a diversity of styles, shapes and sizes, such as 2-wheel motorcycles, compact 2-door cars, 4-door sedans, pickup trucks, SUVs, sports cars, vans, commercial transport trucks, and the like.

Virtually every vehicle is painted a color on its exterior surface, usually intended to enhance the vehicle's aesthetic appeal. Vehicle manufacturers typically produce vehicles in a variety of colors to attract consumers and increase sales. Almost every make and model of vehicle is offered in a plurality of colors. The actual vehicle purchased by a consumer is often influenced by color once they decide which vehicle (make and model) to purchase.

The color of their vehicle and its aesthetic appearance is important to vehicle owners. They strive to maintain the exterior of their vehicle in a clean and damage-free condition. Unsightly dents, scratches, etc, in the vehicle's paint are undesirable as they adversely impact the appearance, aesthetic appeal, and value of the vehicle.

Occasional dents, scratches, etc, or other damage to the paint on a vehicle is sometimes unavoidable. Individuals in public places may cause careless contact with the vehicle, which can damage the paint on the vehicle. For example, a grocery cart in a grocery store parking-lot may accidentally collide with the vehicle, or someone in an adjacent parked vehicle may open their door and accidentally bump it against the vehicle. Other times the vehicle may be involved in a minor traffic accident, sometimes termed a "fender bender," which damages the paint on the vehicle at the point of impact. Such undesirable contacts and accidents usually leave scratches, dents, or even gouges, in the paint on the vehicle that adversely impact the vehicle's aesthetic appeal.

Formal repair for such damage usually requires an auto body shop's professional expertise. However, such formal repairs can be expensive. Users, therefore, tend to either live with the damage, or inexpensively mask the damage, such as with touch-up paint. Inexpensive apparatus is also available to conceal such damage, such as the apparatus taught in U.S. Pat. No. 9,993,994.

Using touch-up paint or an apparatus to mask damage in the paint on a vehicle poses a challenge because the touch-up paint or masking apparatus must accurately match the color of paint on the vehicle. Else the conflicting colors stand out unappealingly.

A common layperson, however, does not have the tools or mechanisms to conveniently determine and inexpensively acquire accurately matching touch-up paint or apparatus for repairing the paint on their vehicle. People therefore tend to either leave the damage unaddressed, or settle for the closest matching touch-up paint or apparatus they can find. Such imperfectly matching touch-up paint or apparatus expectedly creates an undesirable variance in the vehicle's color, which adversely impacts the vehicle's aesthetic appearance.

Accordingly, it is desirable to have a mechanism, device, process, apparatus or method for a layperson to conveniently and accurately match the color of the paint repairs they perform on a vehicle with the actual paint color of the vehicle. It is also desirable for laypersons to be able to conveniently and inexpensively purchase accurately-matching products needed to perform such repairs.

SUMMARY OF THE INVENTION

The present invention provides a method and apparatus for determining the color of paint on a vehicle and for selling products corresponding to that color of paint.

A software application is provided on a computer device. The software application comprises executable instructions stored in a non-transitory computer readable medium and executed by a processor in the computer device. The software application may be an app running on a smartphone, a website hosted on a server, or the like.

A user may capture an image of a vehicle's vehicle identification (VIL) label with an image capturing device. VIL labels are mandatory and are provided on every vehicle, and the image may be captured with any device capable of capturing images, such as a portable camera, a smartphone, an iPad, or the like.

The image of the VIL label may be transferred to the application or the computer device. The image is received and an optical recognition procedure is performed on the VIL label. The optical recognition procedure helps determine the vehicle's vehicle identification (VIN) number. The optical recognition procedure may comprise scanning a coded image, such as a bar code or a QR code, on the VIL label to decipher a corresponding string of alphanumeric characters, which are the vehicle's VIN number. Alternatively, the procedure may extract the alphanumeric VIN number imprinted on the VIL label.

Alternatively, if the optical recognition procedure fails to determine the VIN number, or if the user prefers to, the user may manually enter the VIN number in the application or on the website.

Once the vehicle's VIN number has been determined, a check may be performed to verify whether the VIN number is valid. The character in the 10th position of the VIN number helps determine whether the VIN number is valid. If the VIN number is not valid, the steps to determine the VIN number may be repeated or the user may manually reenter the vehicle's VIN number.

Certain digits of a VIN number include alphanumeric characters that correspond to manufacture information of the vehicle, such as the vehicle's year, make and model. A data storage device may be queried to determine the vehicle's manufacture information based on these alphanumeric characters in the vehicle's VIN number. The determined manufacture information may be displayed to the user for confirmation.

The user may be provided an option to manually enter certain manufacture information for the vehicle, such as its year, make and model.

Vehicle manufacturers typically utilize paint codes for the various paint colors they use on their vehicles. A vehicle's paint code is usually imprinted in a certain location, or zone, on the VIL label. Many vehicle manufacturers imprint their vehicles' paint code at the same predetermined location on all of their vehicle's VIL labels, while others do not display the paint code on their vehicles' VIL labels. In one embodiment, paint code zone information for VILs corresponding to most vehicle manufacturers is stored in a data storage device. The application can query the data storage device and determine whether a particular make and model of vehicle includes a paint code on its VIL label, along with the parameters of the paint code zone on that VIL label. This query is based on the vehicle's manufacture information that was determined previously.

If the particular VIL label includes a paint code zone, a zonal optical character recognition procedure may be performed on the image of the VIL label to extract the paint code imprinted in its paint code zone. This determines the vehicle's actual paint code.

Alternatively, if the VIL label does not include the vehicle's paint code, or if the paint code could not be extracted by the zonal optical character recognition procedure, the application may query a data storage device to determine all colors, and corresponding paint codes, in which the particular year, make and model of vehicle was manufactured. All of those color options may be displayed for the user to select the correct color, or a desired color, thereby identifying the correct color of paint. That color will have a corresponding paint code from the manufacturer, thereby identifying the paint code needed.

In one embodiment, one or more products corresponding to the determined paint code, or color, may be displayed for the user to purchase. The products may include touch-up pens, touch-up paint, apparatus having a color corresponding to the determined paint code, adhesive colored apparatus to conceal the damage in the vehicle's paint such as that taught in U.S. Pat. No. 9,993,994, other apparatus sold commercially under the trademark COLORCOVER, and the like.

If the user opts to purchase any products, an e-commerce transaction procedure may be performed where the user's order information, shipping information, etc, is collected and a payment is processed. The order information may then be forwarded to a computer device, such as an e-commerce server, for processing, shipment and delivery.

DETAILED DESCRIPTION

The systems, methods and apparatus of the present invention are described herein with reference to the figures. The description and figures are for illustrative purposes only, they do not limit the true scope and spirit of the present invention.

Vehicles manufactured and sold commercially typically include a vehicle identification (VIL) label from the vehicle's manufacturer. VIL labels are mandatory, required by law. VIL labels typically include certain information about the vehicle, such as the vehicle's identification (VIN) number, tire information, weight, and the like. Although a vehicle may have a plurality of VIL labels, a VIL label with more information is typically installed on the door or door jamb on the driver's side of the vehicle.

Figure 1:
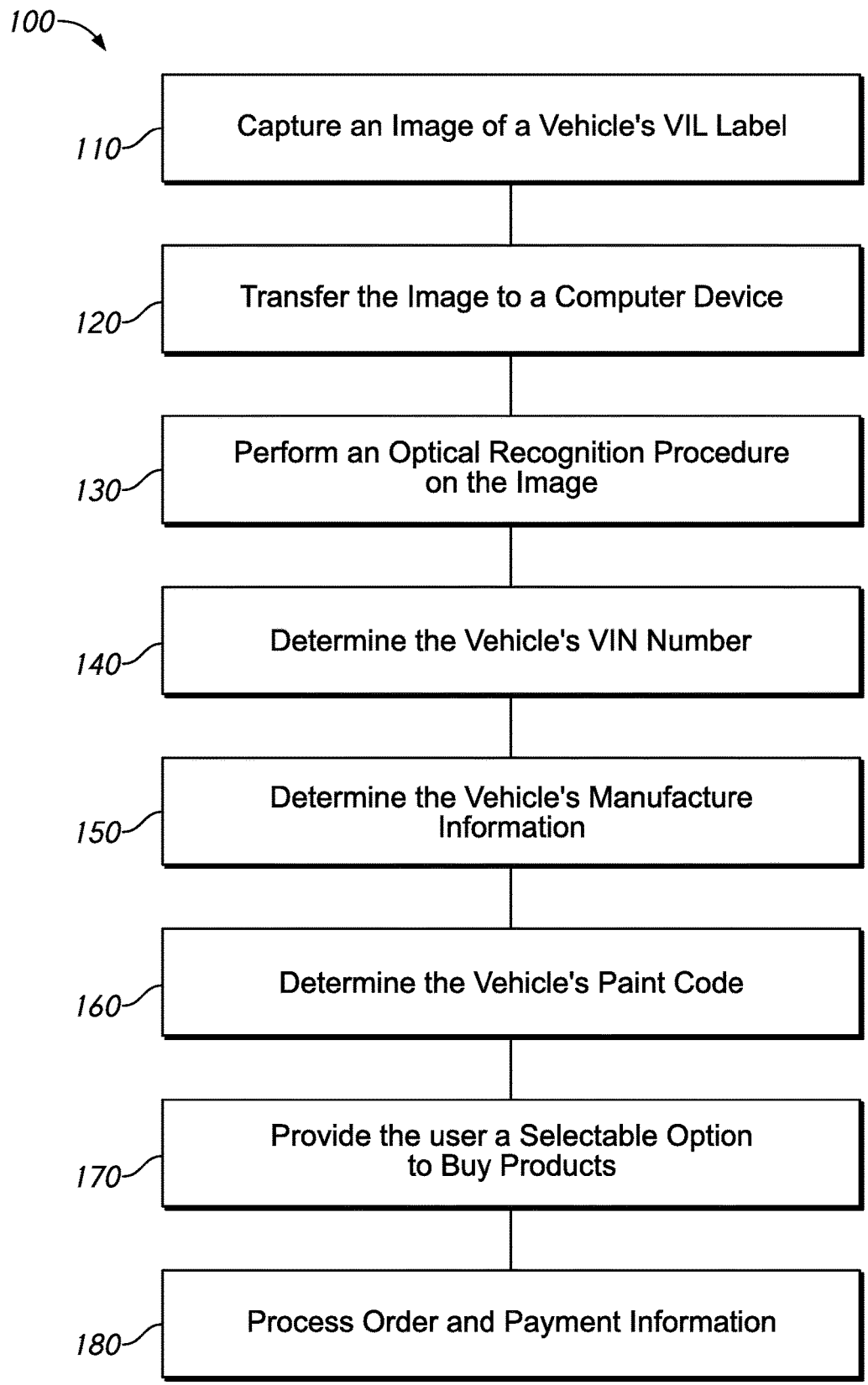
FIG. 1 is a flow chart to help describe a method and apparatus according to some embodiments of the present invention.

Referring to FIG. 1, flow chart 100 helps describe a method and apparatus according to some embodiments of the present invention. In flow chart 100, a user captures an image of a vehicle's VIL label (110) with an image capturing device. The image capturing device may be any portable device capable of capturing images, such as a digital or electronic camera, a mobile communications device such as a cellular phone with a built-in camera, a smartphone with a camera, a tablet with a camera, an iPad, a laptop computer with a camera, or the like. The mobile communication device may also be a personal digital assistant (PDA), a tablet computer, or other mobile devices of the type that have a built-in camera.

Figure 2:
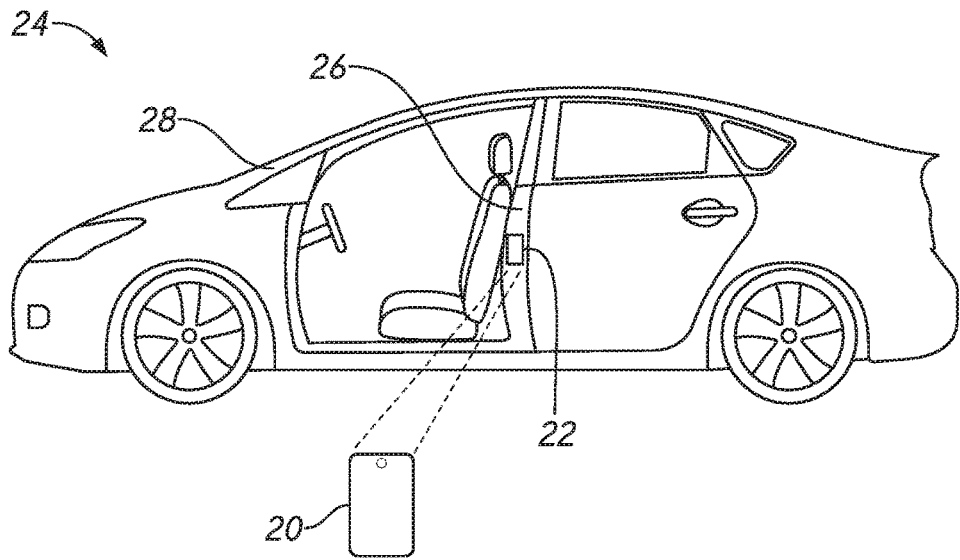
FIG. 2 is an illustration showing an image capturing device for capturing an image of a vehicle identification (VIL) label on a vehicle, with the vehicle depicted in partial view with the driver's side front door removed.

Referring to FIG. 2, an image capturing device 20 may be used to capture an image of a VIL label 22 located on the driver's side door or doorjamb 26 of a vehicle 24. Although the user may capture an image of a different VIL label located elsewhere on the vehicle 24, such as on the driver's side dashboard 28, the VIL label 22 located on the door or doorjamb 26 on the driver's side is preferred because it includes more information, which helps practice the teachings of the present invention better. Other VIL labels on the vehicle 24 having limited information should still be adequate for purposes of the present invention as they include the vehicle's 24 VIN number.

Figure 3:
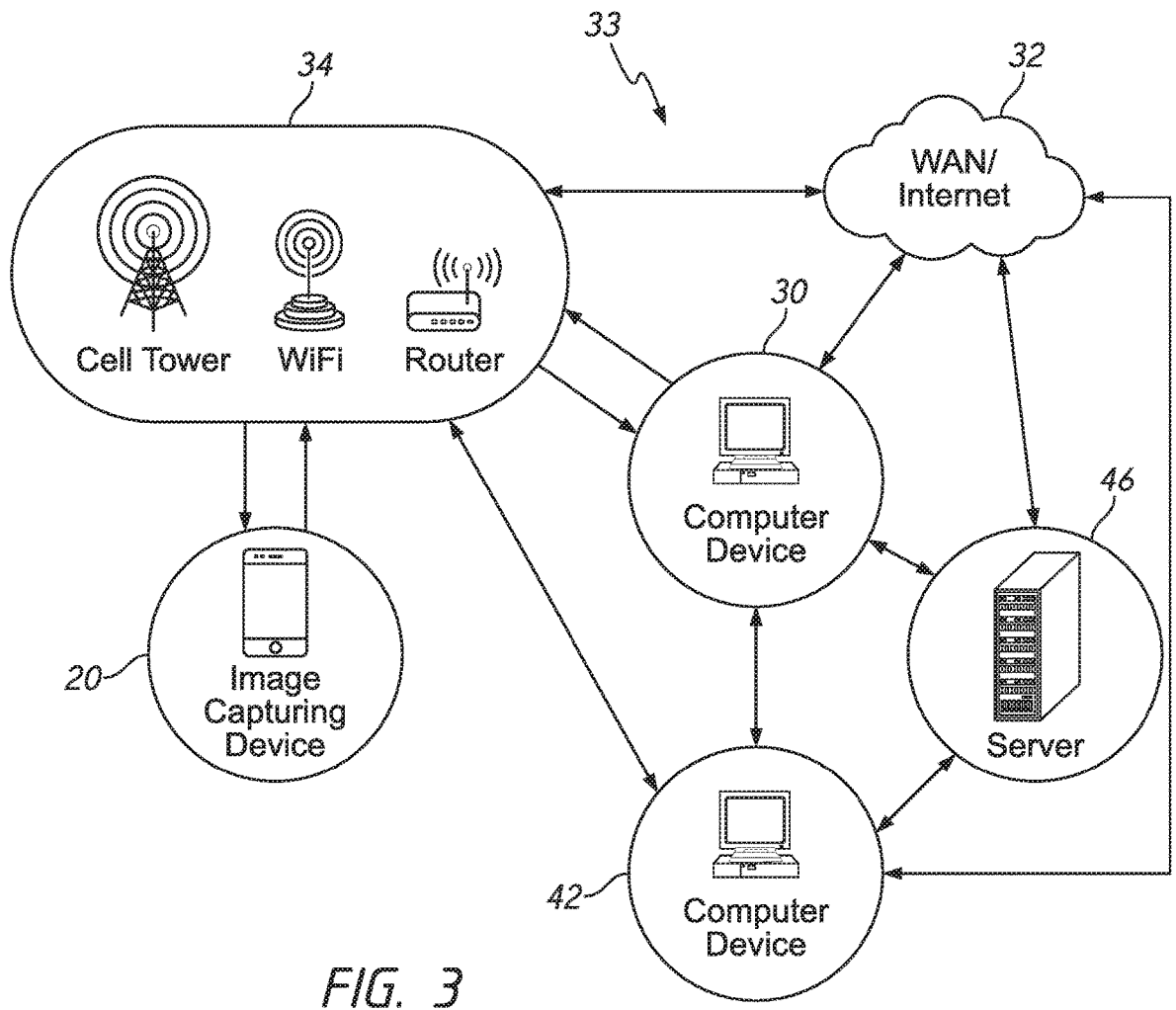
FIG. 3 is a representation of a computerized system with computer devices, apparatus, and the like, in data communication with each other according to some embodiments of the present invention.

FIG. 3 shows a representation of a computerized system 33 with computer devices, apparatus, and the like, in data communication with each other according to some embodiments of the present invention. An image capturing device 20 is in data communication with a computer device 30, which in one embodiment may be via a wide area network 32 such as the internet. In some embodiments data communication between the various computer devices and apparatus in computerized system 33, such as between image capturing device 20 and other devices, is facilitated via wireless cellular services (34) provided by a mobile telephone services company. In other embodiments, data communication between a device in computerized system 33 and wide area network 32, or with other apparatus, may be facilitated through a WiFi connection, a hard-wired link via a router, or another manner known in the art.

In alternate embodiments, a device in computerized system 33 may be coupled to another device, such as image capturing device 20 to a computer device 30, using a cable, USB, Firewire, or the like, or using a wireless means, such as WiFi, Bluetooth, wireless USB, or the like. This eliminates the need for a network for the two devices to communicate with each other.

A computer device in a computerized system, such as computer device 30 in computerized system 33, may be any computer device. A computer device typically comprises a display, an input means, at least one processor, a non-transitory computer readable medium, and an operating system defining a local file system on the non-transitory computer readable medium. One or more processors are capable of reading and executing specialized logic associated with computer programs and applications running on the computer device. One or more processors are also capable of creating, manipulating, altering, and storing data objects and computer data structures in the non-transitory computer readable medium. The computer device may include persistent storage, e.g. magnetic or optical disk, PROM, flash Prom or ROM, or the like, that permanently stores computer programs, applications, and other data usable by the computer device. The computer device uses input and output interfaces to interface or communicate data with the outside world, including with other computer devices or apparatus in the computerized system. Such data communication may occur directly with each other, over a local area network, over a wide area network such as the internet, wirelessly, or the like. The computer device may be, for example, a personal computer, a computer server, a laptop computer, a tablet, a smartphone, a cellular mobile device, an iPad, or the like. In some embodiments, the computer device may be configured differently without one of more of the components mentioned above. For example, in the instance of a server, the computer device may not include a display. Accordingly, a computer device in a computerized system of the present invention is anticipated to be any computing device known in the art with a processor and capable of executing instructions. All such devices are, therefore, within the spirit and scope of the present invention.

A non-transitory computer readable medium in computer device 30 stores an application comprising instructions that are executable by one or more processors in computer device 30. The application may be an app, a browser, a software program, or the like, running on computer device 30. An app, or the like, would be executable locally on computer device 30. On the other hand a browser, or the like, would be configured to access websites or other applications hosted on another computer device in the computerized system 33, such as on computer server 46, which is in data communication with computer device 30. Computer device 30 may be in data communication with the other computer device via a network, such as a wide area network like the internet.

In all such embodiments a user may interface with the app or the browser via a user interface means on computer device 30 while corresponding computerized actions, including methods and steps associated with practicing the present invention, may be performed on computer device 30 or on another computer device in computerized system 33. All such embodiments, therefore, are anticipated and are deemed to be within the spirit and scope of the present invention.

The application on computer device 30 may be installed from a data storage medium like a CD, or it may be available for download in any number of ways known in the art, such as from an application store, from a computer device or server accessible via the Internet, from a desktop computer, from another hand-held device, or the like. Once the application is installed, the application may become a resident application on computer device 30. In one embodiment the application is an app and the computer device is a hand-held device such as a smartphone. In another embodiment the application is a software program running on a desktop or laptop computer. In another embodiment the application is a browser running on a computer device.

The image of a VIL label captured by image capturing device 20 is transferred to computer device 30 (120). The image is received by an application running on computer device 30, and in some embodiments is stored in the non-transitory computer readable medium on computer device 30. If the application is a browser, a user may interface with the browser to access a website, whereby the browser would cause the other computer device to receive the image of the VIL label from computer device 30.

Figure 5:
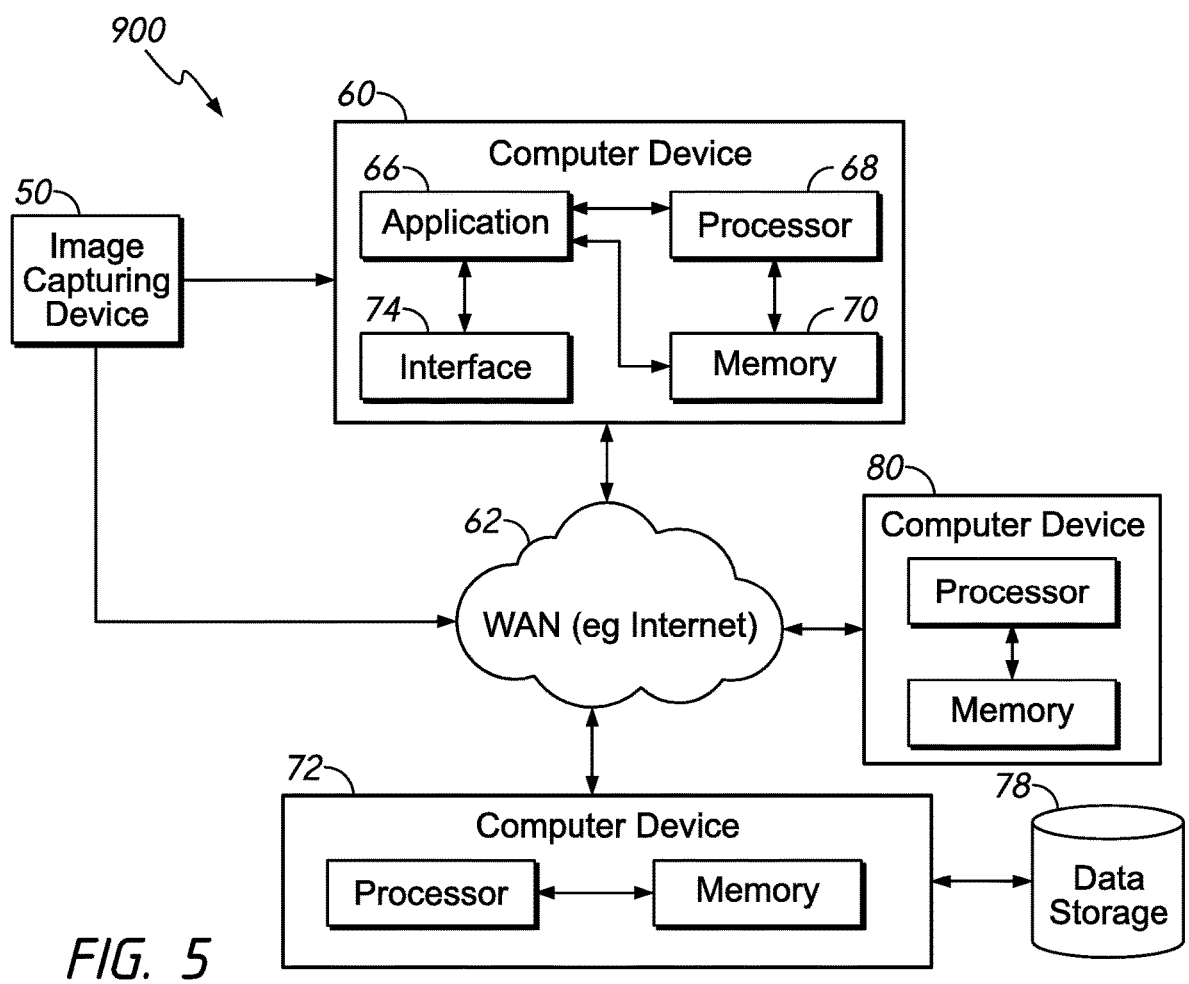
FIG. 5 is a block diagram illustrating a computerized system with computer devices, apparatus, and the like, in data communication with each other according to some embodiments of the present invention.

FIG. 5 shows a block diagram of a computerized system 900 according to one embodiment of the present invention, comprising computer devices, apparatus, and the like, in data communication with each other. Computerized system 900 may comprise any number and types of computer devices and apparatus. The various computer devices and apparatus separately comprise executable instructions which, collectively, implement the teachings of the present invention across the various computer devices and apparatus in computerized system 900. One computer device in computerized system 900 is computer device 60. Computer device 60 comprises an application 66 running on it, and application 66 comprises instructions executable by a processor 68. Application 66 and processor 68 interface with a non-transitory computer readable medium such as a memory 70. In this embodiment an image of a VIL label is transferred from an image receiving device 50, and is received by computer device 60. Image receiving device 50 may communicate data with computer device 60 either directly, or via a wide area network such as the internet 62. In one embodiment, application 66 receives the image of the VIL label and stores it in memory 70.

Figure 4:
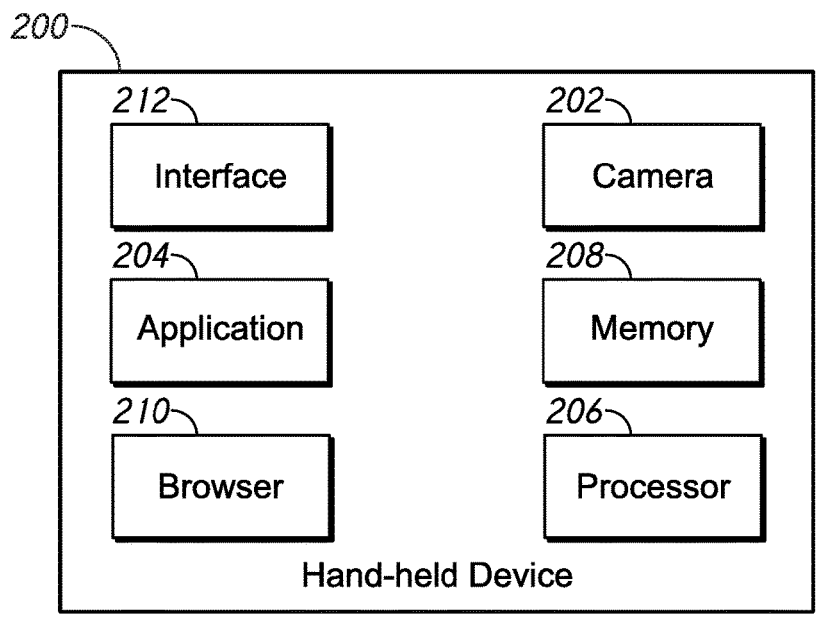
FIG. 4 is a block diagram of a hand-held device and some of its components according to one embodiment of the present invention.

In an alternate embodiment, image capturing device 50 is a hand-held device capable of performing at least some functions similar to a computer device. FIG. 4 shows a block diagram of one embodiment of an image capturing device that is a hand-held device 200 according to one embodiment of the present invention. Hand-held device 200 may be a cellular phone, a smartphone, a tablet, an Pad, or the like. Hand-held device 200 comprises a camera 202 capable of capturing images. Hand-held device 200 has a processor 206 and an application 204 comprising instructions executable by processor 206. Application 204 resides in a non-transitory computer readable medium, which may be a memory 208 in one embodiment. A user may interact with, or operate, a user-operable interface 212 to capture an image of a VIL label using camera 202. The image is transferred from camera 202 and received by application 204, and may be stored in memory 208.

The term application is used in some instances to refer to an installed mobile app on a hand-held device, such as a mobile communications device, smartphone, or the like. However, as a practical matter the terms application and app may be used interchangeably. Application 204, therefore, may be an app, a browser, or the like, running on hand-held device 200, or it may be a software application or a browser running on a personal computer, laptop, or the like. Accordingly, the functions described may be performed by software running on a personal computer or on a hand-held device, and therefore various terms may be used interchangeably while the methods described herein will typically apply to all such embodiments.

An app would typically be executable locally on a local computer device, such as on a hand-held device 200, while a browser would typically be configured to execute locally on a local computer device and access websites or other applications hosted or executed on a remote computer device, such as on a computer server. However, an app may also be configured to be executable locally and access websites or other applications hosted or executed on a remote computer device while keeping with the teachings of the present invention.

In one embodiment, hand-held device 200 is in data communication with a remote computer device via a wide area network such as the internet. A user may operate a browser via interface 212 on hand-held device 200 to access a website on a remote computer device whereby the website receives the image of the VIL label via the browser. In another embodiment a user may operate a browser on a different type of computer device, such as a personal computer, to access a website on a remote computer device whereby the website receives the image of the VIL label via the browser. In all such events a user interfaces with an application via an interface on the local computer device while certain computerized steps may be performed either on the local computer device or on a remote computer device. All such methods and apparatus, therefore, are anticipated and are deemed within the spirit and scope of the present invention.

A user may operate and manipulate the various functions of application 204 and of hand-held device 200 via interface 212. In one embodiment, interface 212 is a touch screen, such as on a smartphone, with various options and selections displayed for the user to select or operate different functions or features of application 204 by touch. The screen receives touch-gestures from the user to manipulate the interface. In other embodiments, interface 212 may be a keyboard, keys, switches, buttons, or a combination thereof, or it may be any other implementation known in the art that allows a user to interface with a hand-held device or with a computer device.

Once the image of the VIL label is transferred and received (120), such as by application 66 on computer device 60 or by application 204 on hand-held device 200, an optical recognition (OR) procedure may be performed on the image of the VIL label (130). Generally, optical recognition systems are computerized systems that read or interpret information, such as coded images or text, from documents, tags, labels, or the like. The optical recognition procedure is performed on the image of the VIL label for reading and interpreting the information imprinted on the VIL label. A VIL label typically includes several items of character data imprinted on it, which correspond to various information pertaining to the vehicle, including the vehicle's VIN number. A VIL label sometimes includes the VIN number encoded in a coded image. The coded image may be any form of image that includes data coded therein. Some examples of coded images known in the art include a bar code, a QR code, a maxicode, a data matrix, a code one, a soft-strip code, and the like.

Figure 6:
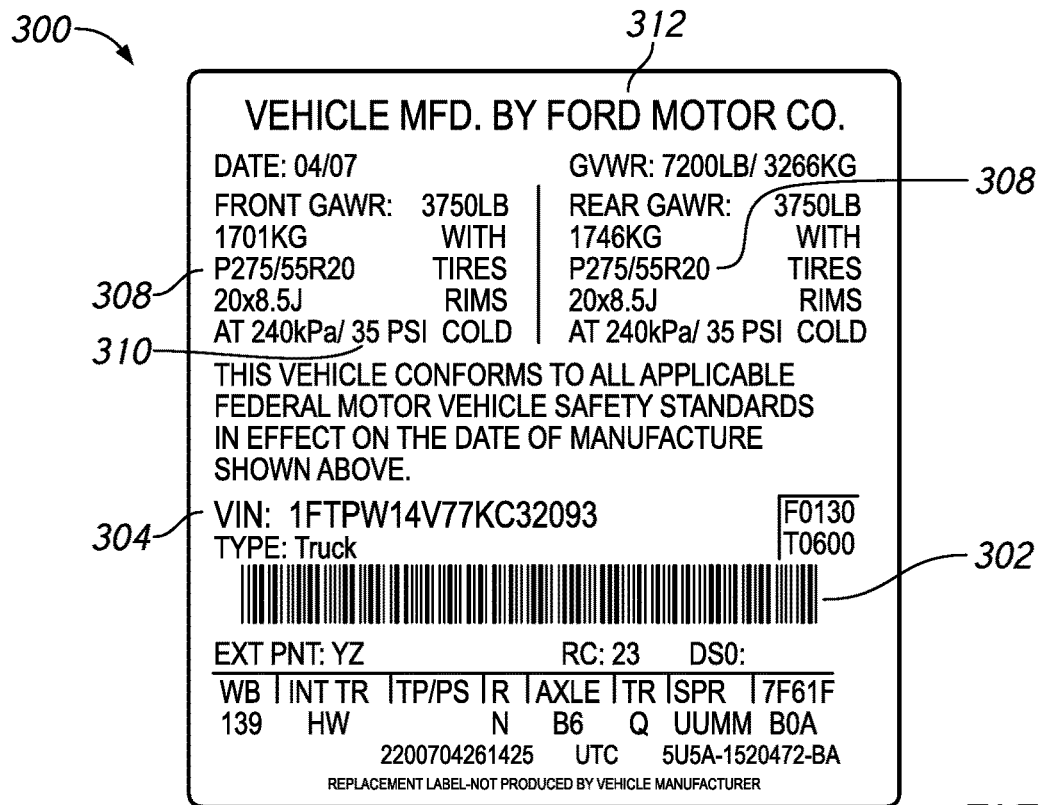
FIG. 6 is an example of a vehicle's vehicle identification (VIL) label.

FIG. 6 shows an example of an image of a VIL label. VIL label 300 is for a vehicle manufactured by Ford Motor Co. VIL label 300 includes several pieces of information pertaining to the vehicle associated with it. For example, VIL label 300 includes the vehicle's tire size 308, tire pressure 310, manufacturer's name 312, VIN number in alphanumeric character form 304, VIN number encoded in a coded image 302, and the like. As evident from the image of VIL label 300, these various pieces of information are positioned at different locations across VIL label 300. Other vehicle manufacturers, however, position such information at different locations on the VIL labels for their vehicles.

The optical recognition procedure on the image of the VIL label (130) may be performed on any computer device or apparatus in a computerized system. Some embodiments of a computerized system 33 and 900 are shown in FIG. 3 and FIG. 5. For example, the optical recognition procedure may be performed on computer device 30 or on hand-held device 200, depending on which device received the image of the VIL label (130) in the particular embodiment. In one embodiment, the optical recognition procedure is performed on another computer device 42 that is in data communication with the device that received the image of the VIL label (130). In an alternate embodiment, the optical recognition procedure is performed on a remote computer server 46 that is in data communication with the device that received the image of the VIL label (130). Data communication between the computer devices may occur in any manner known in the art, such as through a direct connection, either hard wired or wireless, through a WiFi connection, through a local area network, through a cellular data network, through a wide area network such as the internet, or the like.

Figure 7A:
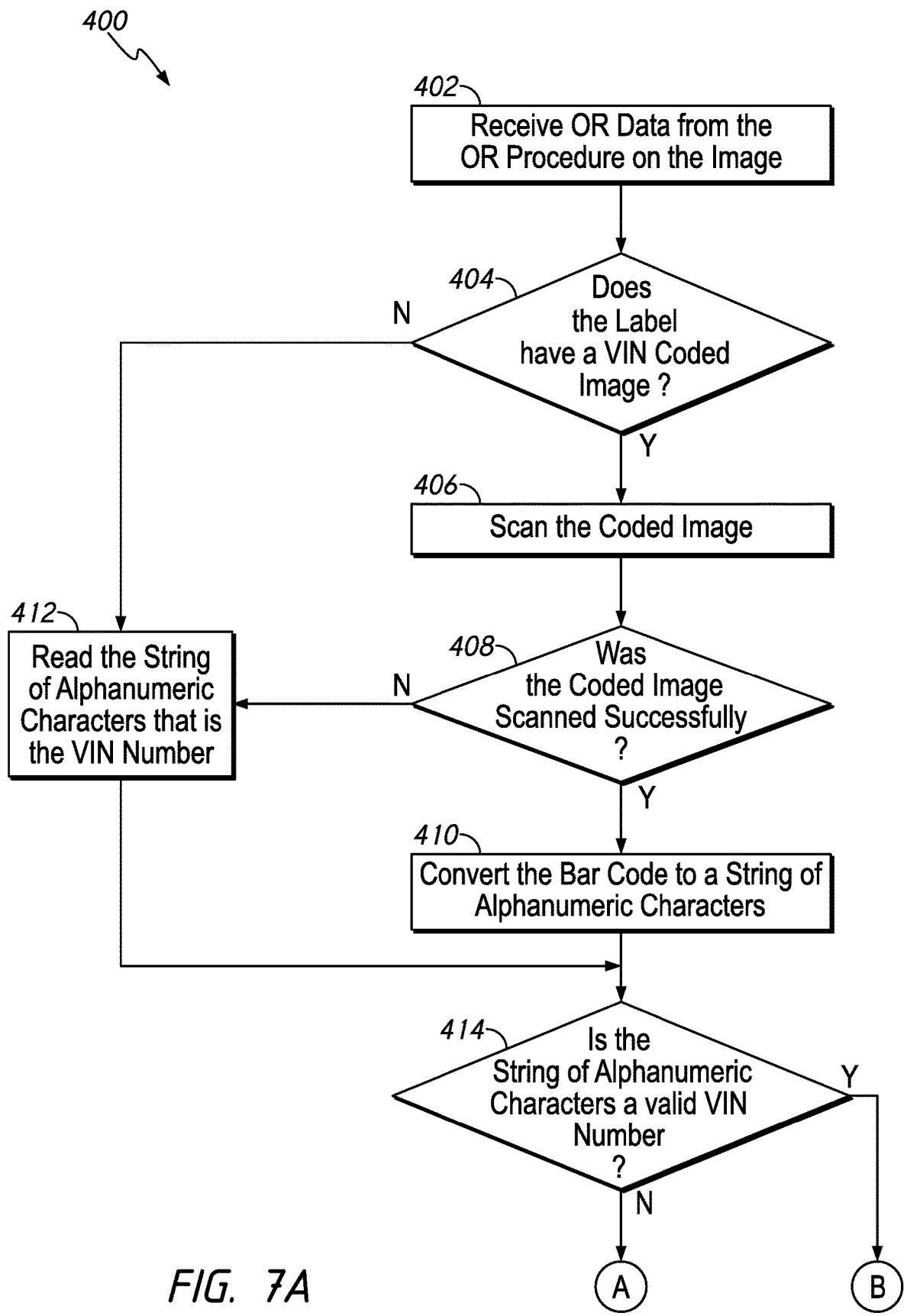
FIG. 7A is the first part of a flowchart of one embodiment of a process to determine certain manufacture information for a vehicle.
Figure 7B:
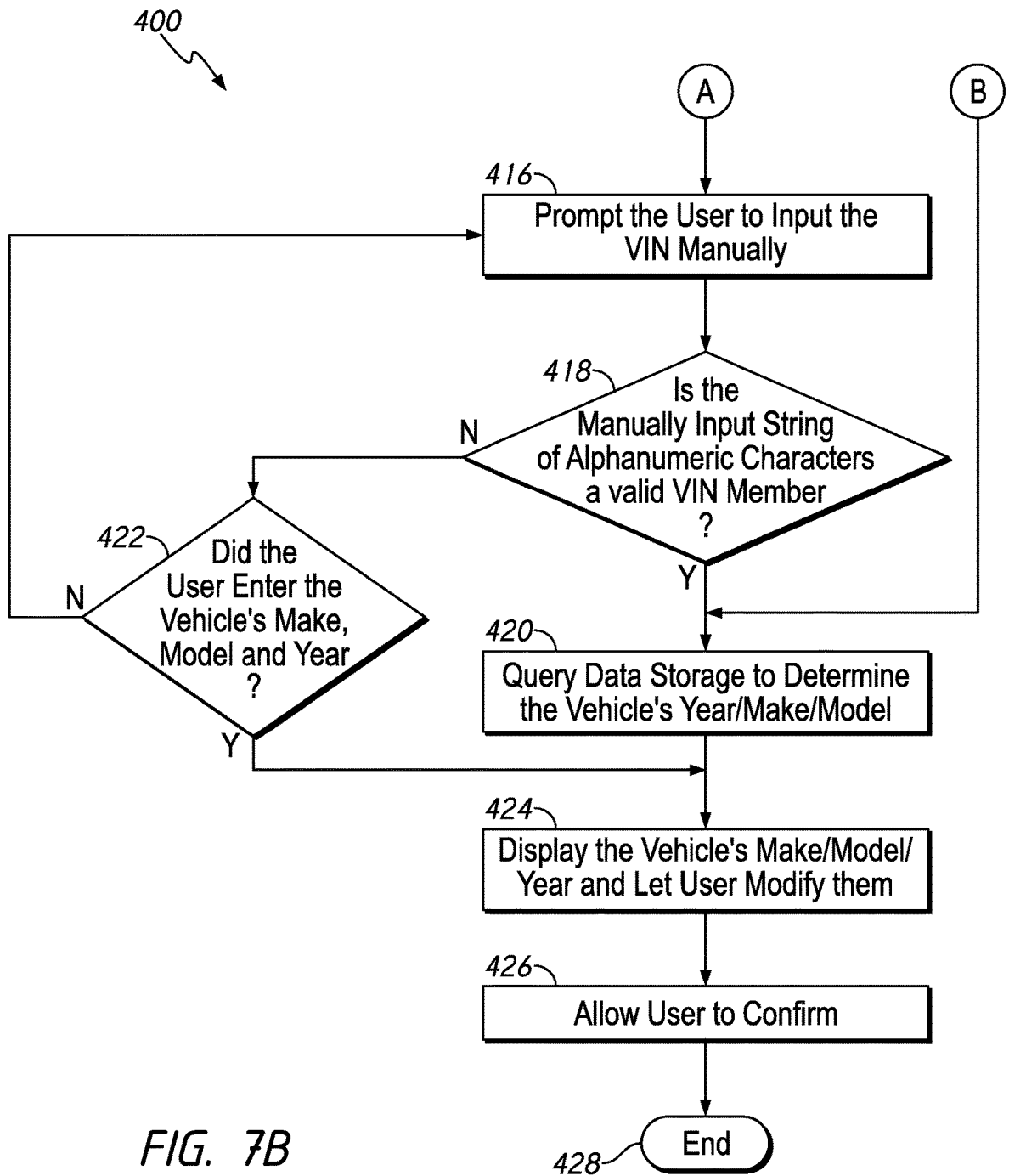
FIG. 7B is the second part of the flowchart of FIG. 7A.

In one embodiment, the optical recognition procedure (130) is used to determine certain manufacture information for the vehicle. FIGS. 7A and 7B show a flowchart 400 of one embodiment of a process to determine certain manufacture information for the vehicle. In flowchart 400, an OR procedure is performed on an image of a VIL label (130), and information from the OR procedure is received by an application on a computer device, such as by application 66 on computer device 60.

Flowchart 400 comprises determining the vehicle's vehicle identification (VIN) number (140). In one embodiment, application 66 is configured to determine the VIN number of a vehicle (140). In some embodiments the application 66 may determine the VIN number locally on computer device 60, while in other embodiments the VIN number may be determined by instructions executed on another computer device in computerized system 900. If the VIL label has a coded image with the vehicle's VIN number 404, a scanning process is performed on the coded image 406 to read it and to decode it. Said scanning process is a part of determining the VIN number. VIL label 300, for example, has a coded image 302 which can be scanned, read and decoded. If the coded image is scanned successfully 408, it produces a string of alphanumeric characters 410, which is the vehicle's VIN number. The string of alphanumeric characters is typically 17 digits long, although it is anticipated that there may be exceptions where vehicles and other embodiments have a VIN number comprising a different number of digits.

If, on the other hand, the VIL label does not have a coded image 404 with the vehicle's VIN number, or the coded image is unable to be read and scanned properly, the string of alphanumeric characters imprinted on the VIL label that is the vehicle's VIN number, which is typically 17 digits in length, is extracted 412 from the OR information generated by the OR procedure 402. Accordingly, VIL label 300 has a 17-digit alphanumeric VIN number 304 imprinted on it, which can be read, and therefore extracted by the OR procedure 402.

Figures 9, 10:
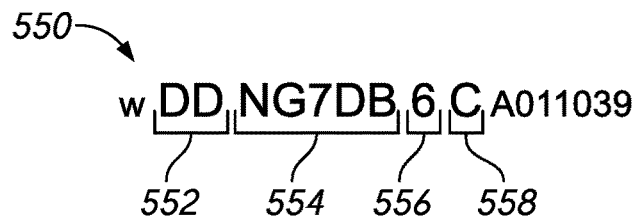
FIG. 9 shows an example of a 17-digit vehicle identification (VIN) number, with digits in certain positions magnified to identify them for representing certain information about the respective vehicle.
FIG. 10 is a table showing a mapping of 1-digit characters with a corresponding year of manufacture for vehicles.

FIG. 9 shows an example of a 17-digit VIN number 550 for a vehicle with digits in certain positions magnified to identify them. Digits in certain positions of a VIN number may represent certain information about the vehicle. A 17-digit alphanumeric VIN number typically includes certain specific information. For example, the 9th digit in a VIN number is a check digit, which helps determine whether the VIN number is a valid VIN number. In VIN number 550, for example, that 9th digit 556 is 6. Algorithms to determine the value of the check digit and to verify whether the corresponding VIN number is valid are public information and are known in the art. These algorithms can be implemented in a computer device in a computerized system of the present invention by one with ordinary skill in the art.

In flowchart 400, the check digit is used to determine whether the VIN number, whether scanned 410 or read 412, is valid. In VIN number 550, for example, for the check digit 556 "6", a check may be performed by computerized device 60 in computerized system 900 by running the appropriate algorithm on VIN number 550 to verify whether it is valid.

If the VIN number is not valid 414, the user may enter the VIN number manually, such as in application 66 using interface 74 or in application 204 using interface 212. In one embodiment, the user is prompted to manually enter a VIN number 416 if the VIN number is not valid 414.

Figure 8:
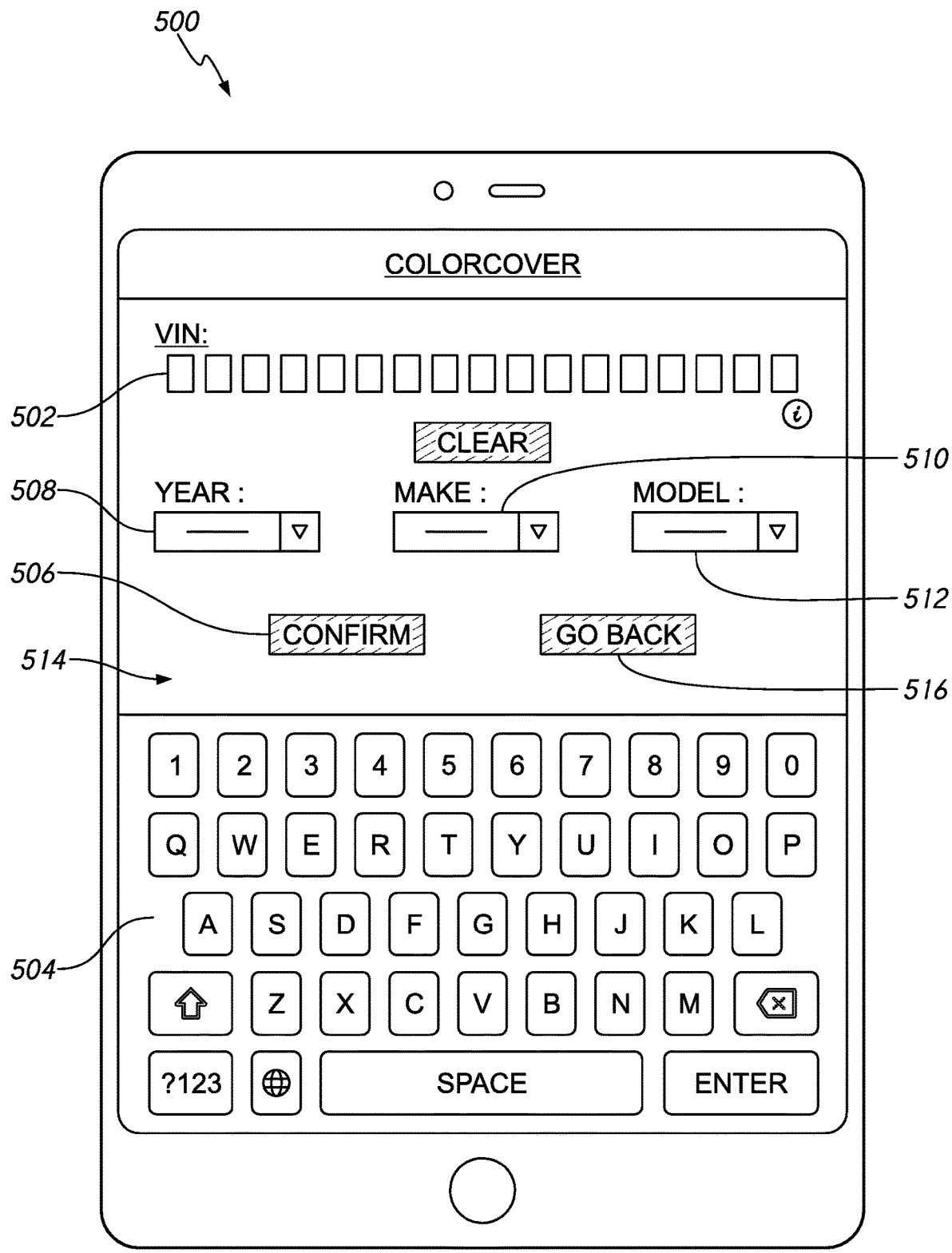
FIG. 8 is a representation of a visual display on a hand-held device for a user to enter and/or confirm the vehicle's vehicle identification (VIN) number and manufacture information.

Referring to FIG. 8, a representation of a visual display 500 for a hand-held device running an application according to one embodiment of the present invention is shown. In one embodiment, the hand-held device is a smartphone. The screen 514 in this embodiment is a touch-screen, whereby a user interfaces with and manipulates the application by touching the screen 514. The user may manually enter the vehicle's 17-digit VIN number 502 using an input means, which in this embodiment is a keyboard 504 on screen 514. The digits of the VIN number entered by the user are visually displayed 502 on the screen.

When the user manually enters all digits of the VIN number, the check digit, like the 9th digit of the VIN number in one embodiment, may be used to verify that it is a valid VIN number 418.

Once a valid VIN number has been determined (140), the VIN number's digits can help determine certain manufacture information for the vehicle.

A digit in a VIN number typically designates the year when the vehicle was manufactured. This digit is usually the 10th digit in a 17-digit VIN number. This particular digit refers to a predetermined mapping of 1-letter digits with a corresponding year of manufacture. Referring to FIG. 10, a table 570 shows a predetermined mapping of 1-digit characters with a corresponding year of manufacture for vehicles. In VIN number 550, for example, the 10th digit 558 is "C". From the table in FIG. 10, the year of manufacture for a vehicle with code "C" is "2012" 572.

Table 570 and the process for determining the year of manufacture from the 10th digit of a vehicle's VIN number can be implemented on a computer device. In one embodiment, table 570 is stored in a data storage, with the 1-digit codes and their corresponding years of manufacture maintained as discrete data objects in the data storage. The data storage may be associated with a computer device in the computerized system. In some embodiments the computer device associated with the data storage is different from a computer device generating a query for the year of manufacture based on the VIN number, while in other embodiments it may be the same computer device. It is anticipated that the computer device generating the query will be the one running the application.

Figure 13:
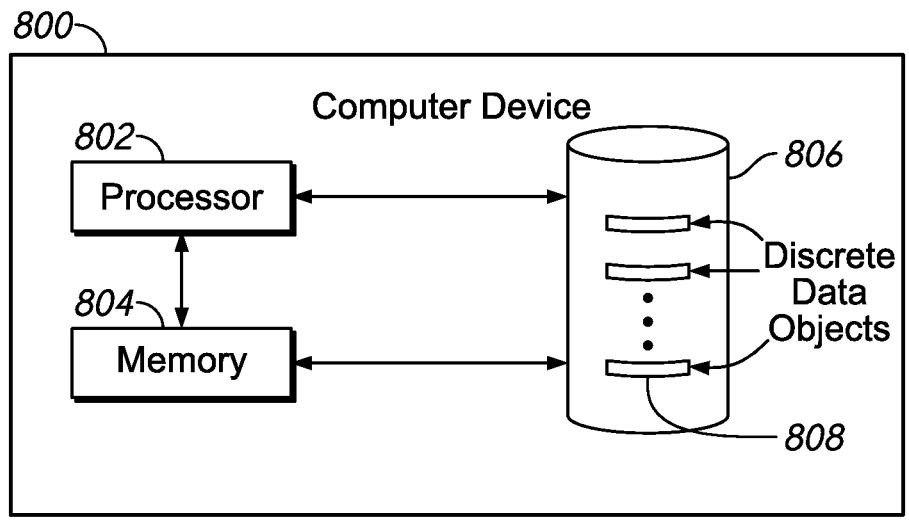
FIG. 13 shows an exemplary data storage implemented on a computer device or server.

FIG. 13 shows an exemplary data storage associated with a computer device 800. Computer device 800 is a server in one embodiment. Computer device 800 includes a processor 802 and a non-transitory computer readable medium such as a memory 804. Processor 802 and memory 804 interface with each other, and with a data storage means 806. Data storage means 806 may be any data storage device configurable to hold data in a computer readable format, such as a database implemented on one or more hard drives or solid state drives. Data storage means 806 comprises discrete data objects 808, which correspond to unique and distinct items of data. In one embodiment, discrete data objects 808 comprise a 1-digit character, or code, and a corresponding year of manufacture for a vehicle, such as shown in table 570 of FIG. 10. In this embodiment, memory 804 stores instructions which, upon execution by processor 802, retrieve from storage means 806 a vehicle's year of manufacture corresponding to a particular 1-digit character. Such instructions would typically be executed in response to a query from an application or app running on a different computer device that determined the vehicle's VIN number (140). This other computer device would be a part of the computerized system and in data communication with computer device 800. The query would be based on the digit in the the vehicle's VIN number corresponding to the year of manufacture, which is typically the 10th digit in a 17-digit VIN number.

Other predetermined digits in a VIN number designate the manufacturer of the vehicle. These are typically the 2nd and 3rd digits in a 17-digit VIN number. In FIG. 9, the 2nd and 3rd digits 552 in VIN number 550 are "DD". Various vehicle-manufacturers manufacture vehicles in various countries around the world, with each manufacturer typically having one or more unique 2-digit manufacturer codes. In one embodiment, a mapping of such codes with the corresponding manufacturer's details are maintained in a data storage device associated with a computer device in a computerized system of the present invention. One embodiment is similar to the implementation shown in FIG. 13 and discussed above where computer device 800 has a processor 802, a memory 804, and a data storage means 806 that interface with each other. Data storage means 806 comprises discrete data objects 808. Some discrete data objects 808 comprise a 2-digit code corresponding to a name of a vehicle-manufacturer. In this embodiment, memory 804 stores instructions which, upon execution by processor 802, retrieve from data storage means 806 a vehicle manufacturer's name corresponding to a particular 2-digit code. Such instructions would typically be executed in response to a query from an application or app running on a computer device that determined the vehicle's VIN number (140). Such query would be based on predetermined digits in the the vehicle's VIN number, such as the 2nd and 3rd digits in a 17-digit VIN number.

Some predetermined digits of a VIN number include certain information about the vehicle, such as the vehicle's model. Typically in a 17-digit VIN number the five digits in 4th through 8th position include certain information about the vehicle, such as the vehicle's model. In FIG. 9, the 4th through 8th digits 554 in VIN number 550 are "NG7DB".

Vehicle manufacturers produce their vehicles in various models, with various engine sizes, etc. Vehicle manufacturers typically include such information by coding it in these particular five digits of the vehicle's VIN number. In one embodiment, a mapping of such 5-digit codes for various vehicle manufacturers with information about the corresponding vehicle's model name are maintained in a data storage means associated with a computer device in a computerized system of the present invention. One embodiment is similar to the implementation shown in FIG. 13 and discussed above where computer device 800 has a processor 802, a memory 804, and a data storage means 806 that interface with each other. Data storage means 806 comprises discrete data objects 808. Some discrete data objects 808 comprise codes corresponding to the model of a vehicle. In this embodiment, memory 804 stores instructions which, upon execution by processor 802, retrieve from storage means 806 a vehicle's model name based on the particular 5-digit code in the 4th through 8th position of the vehicle's VIN number. Such instructions would typically be executed in response to a query from an application or app running on a computer device that determined the vehicle's VIN number (140), and such query would be based on predetermined digits in the the vehicle's VIN number, such as the 4th through 8th digits in a 17-digit VIN number.

The data corresponding to the various codes in a VIN number may be stored in separate data storage devices, or all in one storage device, or in a combination of a plurality of storage devices. All such embodiments are anticipated and are within the spirit and scope of the present invention. In one embodiment, application 66 in computer device 60 generates the queries to a computer device 72 with an associated data storage device 78, and computer device 72 determines the vehicle's year, make and model based on the received queries and returns the queried information to application 66 in computer device 60. In another embodiment, application 66 queries the vehicle's desired manufacture information from a third party provider of such services, who returns the queried information to application 66 in computer device 60.

In flowchart 400, if the vehicle's VIN number is valid 418 the vehicle's manufacture information is queried 420 from one or more data storage means. In computerized system 900, such data communication may occur over a wide area network 62, such as the internet.

In one embodiment, application 66 on computer device 60 communicates a query to computer device 72 based on digits in specific positions of the 17-digit VIN number. In this embodiment, computer device 72 is owned and/or operated by a third party. Computer device 72 has a data storage device 78 associated with it, which comprises vehicle manufacture information, such as the year, make and/or model of vehicles, corresponding to predetermined codes positioned in certain digits of a vehicle's VIN number. Computer device 72 responds to such queries from application 66 with the vehicle's make, model and year information retrieved from data storage 78. Services such as those performed by computer device 72 are commercially available from third parties on a per-query basis or on a monthly-subscription basis, with the provider providing an application programming interface (API) for facilitating communication and queries between a client's computer device and the service-provider's computer device (or server). All such embodiments are anticipated and are intended to be covered by the present claims without departing from the spirit and scope of the present invention.

In flowchart 400, if the manually entered VIN number is not valid 418, the user may manually enter the vehicle's manufacture information, such as the year, make and model of the vehicle. For instance, in the event that the manufacture information determined by the steps above is incorrect, or was unable to be determined, or the user prefers to enter a different vehicle's information, the user may enter the vehicle manufacture information manually.

In an alternate embodiment, the steps to determine the vehicle's manufacture information from a VIL label may be skipped altogether and the user may enter the vehicle's VIN number or the vehicle's manufacture information manually.

FIG. 8 shows one embodiment of screen 514 where the user may enter a year 508, make 510 and model 512 for a vehicle. In one embodiment, the year 508, make 510 and model 512 are drop-down menus that include a pre-populated list of years, vehicle makes, and corresponding vehicle models. Such information may be stored in a data storage and retrieved by the application, or it may be stored in the application, whereby it can be pre-populated into these lists. The user may selectively choose an option from the list in each drop-down menu. In alternate embodiments, the user could manually enter such information using an input means, such as with keyboard 504.

In flowchart 400, if the VIN number manually input by the user is not a valid VIN number 418, then the user may enter the vehicle's desired manufacture information manually as described above. In this embodiment, if the user does not correctly enter the vehicle's manufacture information, i.e. year, make and model 422, in a timely manner then the user is prompted to again enter the vehicle's correct VIN number 416, followed by the subsequent steps to verify the validity of the VIN number 418, and the like, as discussed above. On the other hand, if the user enters the vehicle's manufacture information correctly, then the process for determining the vehicle's manufacture information (150) is complete.

After determining the vehicle's manufacture information (150), the manufacture information is displayed to the user 424. In one embodiment, the determined manufacture information (150), comprising the vehicle's year 508, make 510 and model 512, is displayed visually on screen 514. If the user desires, he may selectively change the vehicle manufacture information; such as by manually entering new information via keyboard 504 or by touching the drop-down menus for year 508, make 510 and/or model 512 and selecting different values.

In one embodiment, when the manufacture information displayed on the screen is what the user desires, the user may confirm 426 with a CONFIRM button 506. Alternatively, the user may choose to go back with a GO BACK button 516 and repeat the previous steps of determining the vehicle's correct VIN number, and the like.

Figure 11:
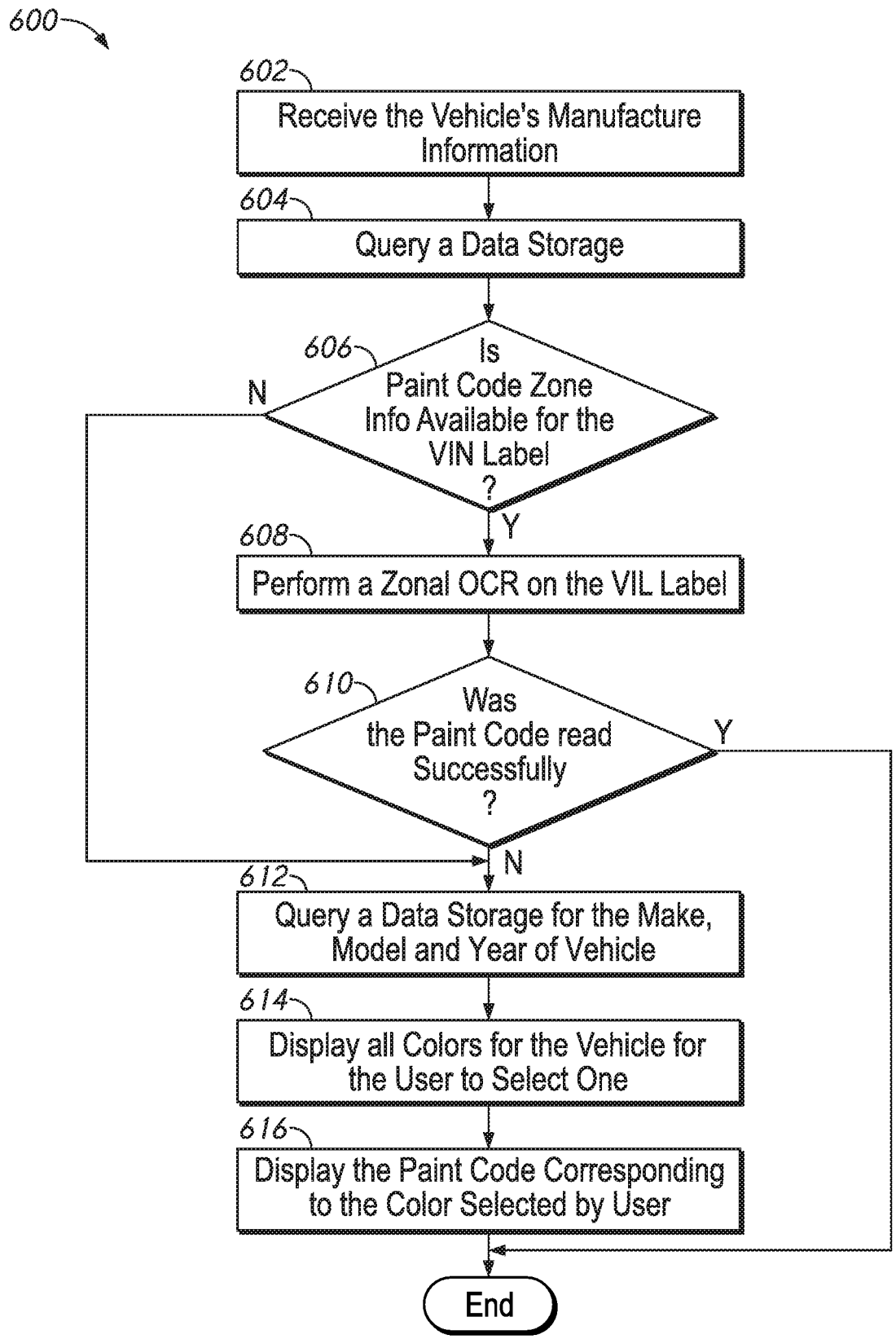
FIG. 11 is a flowchart of one embodiment of a process to determine a vehicle's paint code from the vehicle's manufacture information.

After the vehicle's manufacture information has been determined (150), the vehicle's paint code may be determined (160). FIG. 11 shows a flowchart 600 of one embodiment of the process to determine a vehicle's paint code based on the vehicle's manufacture information. In one embodiment, application 66 in computer device 60 (in computerized system 900) receives the vehicle's manufacture information 602. Application 66 then submits a query to a data storage associated with a computer device in computerized system 900. The query is based on the vehicle's manufacture information. In one embodiment, the query is submitted to the same computer device as previous queries, such as queries for the vehicle's year, make, and/or model, while in other embodiments this query may be submitted to a different computer device with a different data storage. It is anticipated that in an alternate embodiment a data storage may be associated directly with computer device 60 and the query would be performed on that data storage and no data communication outside computer device 60 would be necessary.

Figure 12:
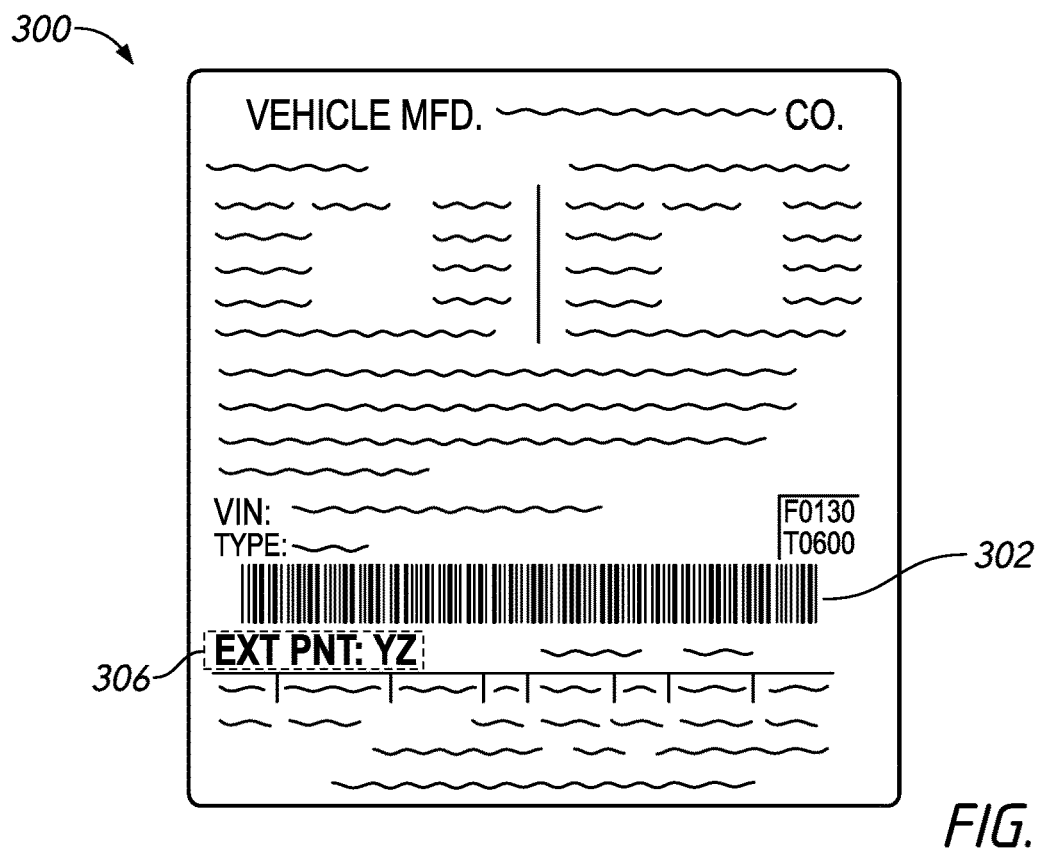
FIG. 12 is the vehicle identification (VIL) label of FIG. 6 with the vehicle's paint code in a paint code zone identified for illustrative purposes.

VIL labels usually include the vehicle's paint code imprinted on them. For example, FIG. 12 shows VIL label 300 of FIG. 6 with a paint code imprinted on it. The paint code is imprinted in a paint code zone 306, which is identified in FIG. 12 for illustrative purposes. In this VIL label, paint code zone 306 reads "EXT PNT: YZ", which indicates—the 'exterior paint' code of the vehicle is: 'YZ'. Although VIL labels have a paint code imprinted on them, different vehicle-manufacturers place this information at different locations on their respective VIL labels. Accordingly, the paint code for a vehicle cannot be determined by scanning or reading the same area of every vehicle's VIL label.

Typically, vehicle manufacturers place the paint code information at the same location on each of their own vehicles' VIL labels. For example, VIL label 300 in FIG. 6 and FIG. 12 is for a vehicle manufactured by Ford Motor Company. Accordingly, vehicles manufactured by Ford Motor Company should have their paint code imprinted in the same location on their VIL labels as paint code zone 306 on VIL label 300.

The particular parameters of paint code zone 306, i.e. the area comprising the imprinted paint code on VIL label 300, can be predetermined with respect to the overall parameters of VIL label 300. Similarly, the particular parameters, i.e. the location, of paint code zones on every vehicle manufacturer's VIL labels can be predetermined with respect to the overall parameters of their VIL labels. A database of this predetermined paint code zone information for various vehicle manufacturers can be maintained in a data storage system. That data storage system can be associated with a computer device in a computerized system.

Figure 14:
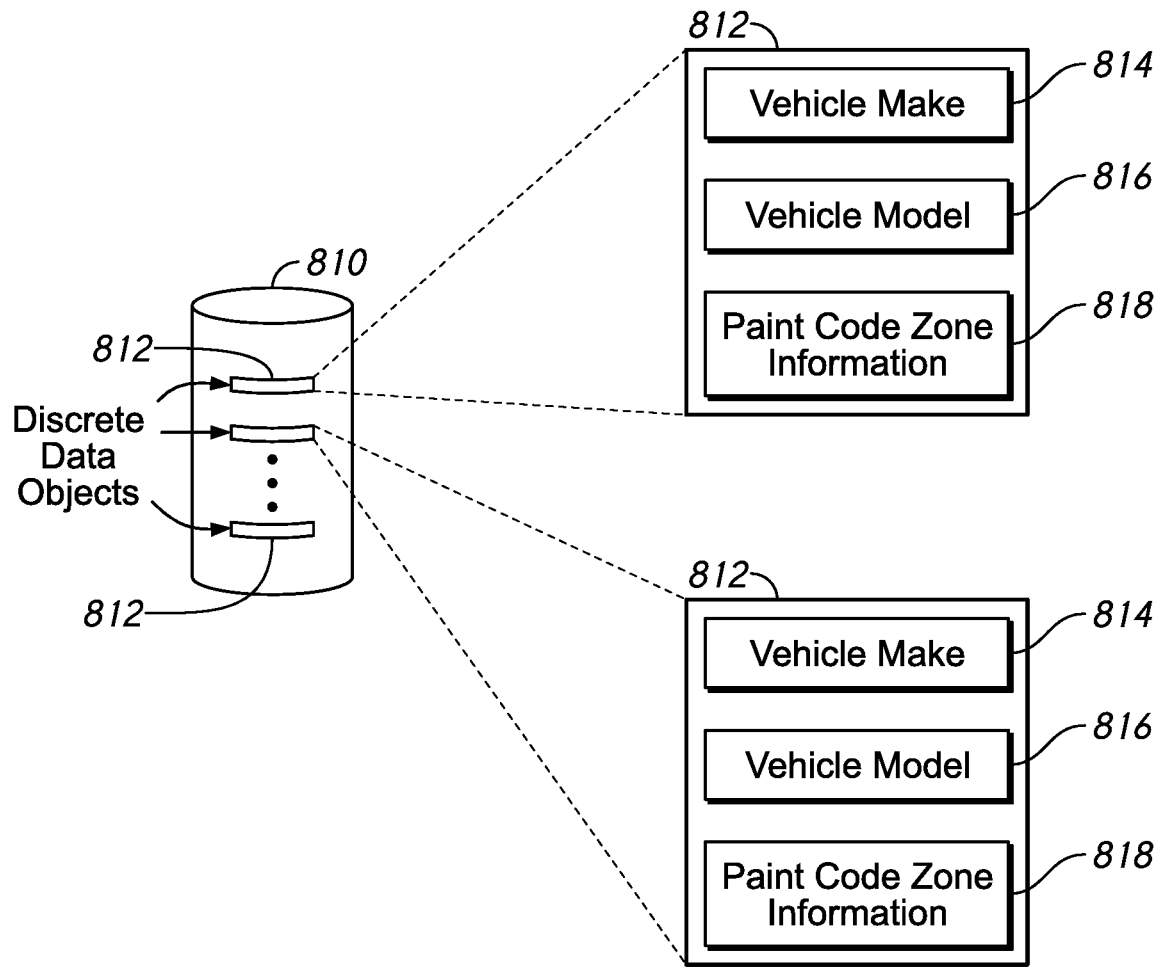
FIG. 14 shows an exemplary data storage system with Paint Code Zone information for vehicles.

FIG. 14 shows an exemplary data storage system 810 with Paint Code Zone information for various vehicle manufacturers. Data storage system 810 is associated with a computer device in computerized system 900, and in one embodiment receives queries from application 66. The computer device associated with data storage system 810 may be computer device 60, or any other computer device, apparatus, or the like, in computerized system 900. Data storage system 810 comprises discrete data objects 812. In one embodiment, data storage system 810 comprises a separate data object 812 for each vehicle manufacturer.

Each data object 812 comprises information pertaining to vehicle manufacturers and a paint code zone on their respective VIL labels. Paint code zone information 818 in each data object 812 comprises the parameters of the paint code zone on the corresponding VIL label. The parameters of paint code zone information 818 are determined with respect to the corresponding VIL label's overall parameters. In one embodiment, data objects 812 include the make 814, the model 816, and the paint code zone information 818 for a particular make and model of vehicle.

Paint code zone information 818 will usually remain consistent for all models of a particular make, or manufacturer, of vehicles. However, it is anticipated that certain makes, or manufacturers, of vehicles may have paint code zones that vary between their various models of vehicles. It is preferable that each data object 812 include paint code zone information 818 for each model 816 of vehicle for every make 814, or manufacturer, of vehicles. However, an alternate embodiment may exclude the model 816 information from data objects 812 and comprise paint code zone information 818 only by the make 814, or manufacturer, of vehicles.

In certain instances, a vehicle manufacturer, or a particular model for a particular make of vehicle, will not include a paint code on their VIL labels. In such instances, no paint code zone will exist on the VIL label (because of the absence of a paint code). The paint code zone information 818 in the data object 812 for that particular make and model of vehicle will indicate that information, such as by having a null indicator or a particular code such as NONE for the paint code zone information 818. Such null indicator or particular code will tell the querying application or computer device that no paint code zone exists for the VIL label being queried.

In response to a query 604 for data storage system 810, paint code zone information 818 for the particular make and model of vehicle is returned to the querying application or computer device, which is application 66 on computer device 60 in one embodiment. If data storage system 810 includes paint code zone information 818 for the particular VIL label 606, then valid paint code zone information 818 is returned and is received by application 66.

A zonal optical character recognition (ZOCR) procedure is then performed on the VIL label 608. A ZOCR is an optical recognition procedure that reads characters on a document, or a label, or the like, that are located in a specific predetermined zone, or geographical area, of the document, or label. In one embodiment, the ZOCR procedure is performed specifically on the paint code zone on the image of the VIL label, to extract the paint code in the paint code zone. The ZOCR procedure is performed by application 66 on computer device 60 in one embodiment. In another embodiment, the image of the VIL label and the paint code zone information are communicated to another computer device, and the ZOCR procedure is performed 608 by that computer device. The ZOCR procedure thus determines the paint code in the paint code zone of the VIL label.

On the other hand, if a null indicator or a code such as NONE is returned to indicate that either no paint code zone information exists on the that VIL label or that paint code zone information is not available from data storage system 810 for that particular make or model of vehicle, then no ZOCR procedure needs to be performed on the VIL label.

In one embodiment, application 66 requests the ZOCR procedure 608 with only that portion of the image of the VIL label that comprises the paint code zone. Sending only a part of the image of the VIL label, instead of the whole image, for performing the ZOCR procedure can save processing time, thereby improving latency. This smaller portion of the image of the VIL label can be determined based on the paint code zone's parameters, which were already determined.

The ZOCR procedure 608 extracts the characters which are the paint code of the vehicle. Accordingly, if the paint code is read successfully by the ZOCR procedure 608, then the desired paint code, and therefore the paint on the vehicle, has been determined (160).

On the other hand, if the ZOCR procedure 608 fails to read the paint code on the VIL label successfully 610, or if paint code zone information is not available for the particular VIL label 606, then the paint code for the vehicle may be determined by querying a data storage 612 based on the vehicle's manufacture information.

Figure 15:
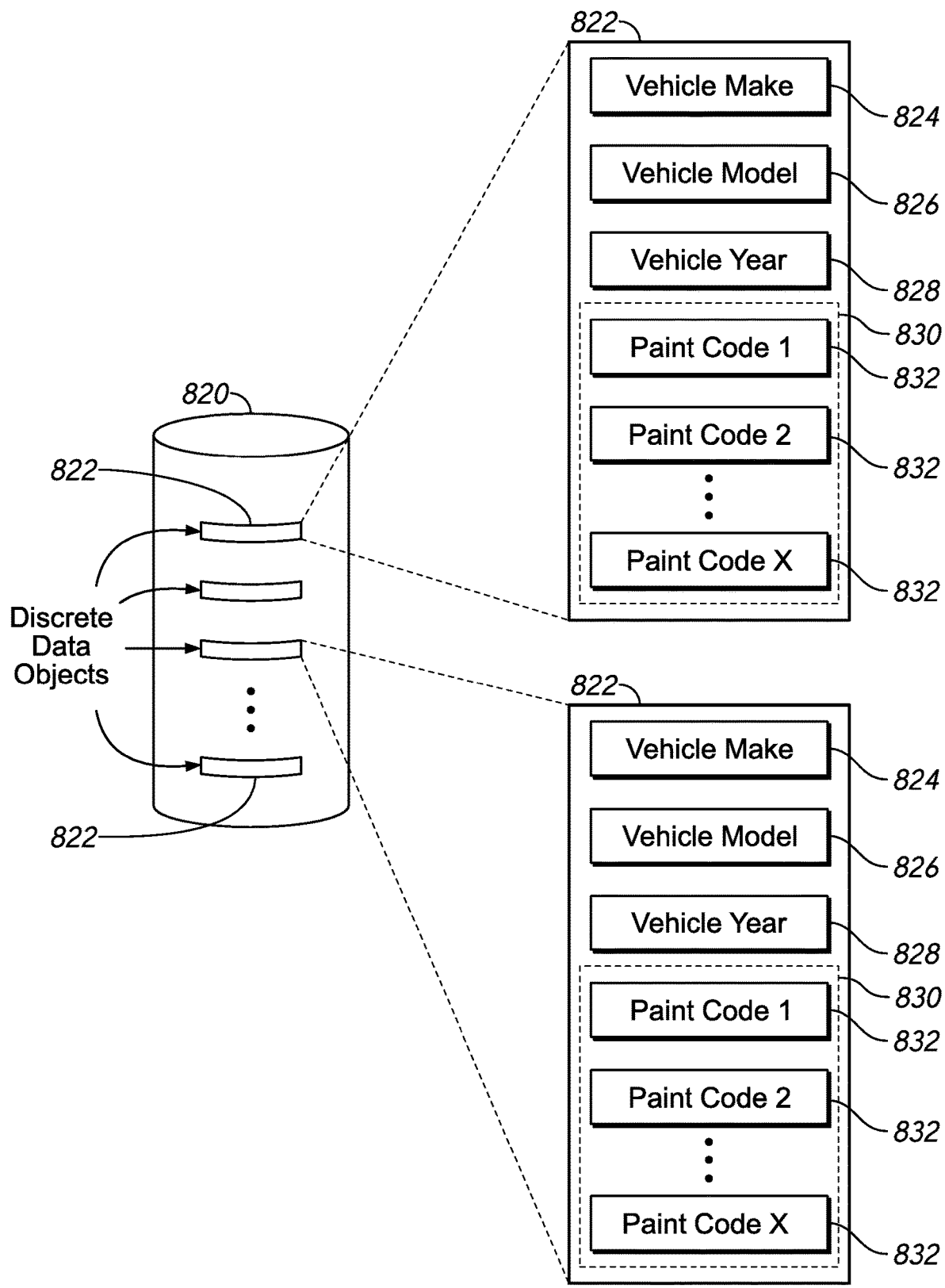
FIG. 15 shows an exemplary data storage system with vehicle color and paint code information for vehicles.

The various colors in which a year, make and model of vehicle was manufactured is generally public information. In one embodiment, a database of this vehicle-color information organized by year, make and model of vehicle is maintained in a data storage. FIG. 15 shows an exemplary data storage system 820 with paint colors and codes for vehicles. In one embodiment, data storage system 820 is associated with a computer device in computerized system 900, which computer device receives queries from application 66 on computer device 60. Data storage system 820 comprises discrete data objects 822. In one embodiment, data storage system 820 includes a separate data object 822 for the different years, makes and models of vehicles sold commercially.

Each data object 822 comprises distinct information pertaining to a specific vehicle make and model manufactured during a particular year. In one embodiment, each data object 822 comprises the make 824, the model 826, and the year 828 of a vehicle, and a list 830 of paint codes 832 in which that particular vehicle was manufactured and sold commercially. Preferably, the list of paint codes 830 comprises all of the paint codes in which that particular year 828, make 824 and model 826 of vehicle was manufactured. In an alternate embodiment, each paint code in the list of paint codes 830 also includes the name of the corresponding paint color 832.

In response to a query 612, data storage device 820 returns a list of paint codes 832 for the particular year 828, make 824 and model 826 of vehicle to the querying application and computer device, which is application 66 and computer device 60 in one embodiment. The colors corresponding to each paint code in the list 830 are then displayed to the user. In one embodiment each color's name is also displayed with the color. The displayed list of colors allows the user to identify and select his vehicle's specific color, or alternatively, select a desired color. The color selected by the user will be the desired paint color, and the paint code associated therewith will be the desired paint code.

The aesthetic appearance and names of colors corresponding to a vehicle manufacturer's paint codes is typically public information. A database of this information may be stored in a data storage device associated with a computer device in a computerized system. In one embodiment, such a database is implemented on the computer device running the application generating query 612, while in another embodiment such a database is implemented in a data storage device associated with a different computer device in the computerized system. In one embodiment, the database is implemented in the same data storage device as data storage system 810 comprising paint code zone information. In another embodiment, the database is implemented in data storage device 820 comprising lists of paint codes for specific year, make and model of vehicles. In an alternate embodiment, the database is implemented in a separate data storage device that is owned, operated and managed by a third party vendor who provides such services commercially for a fee. All such embodiments and variations are anticipated and are covered by the claims of the present invention.

Figure 16:
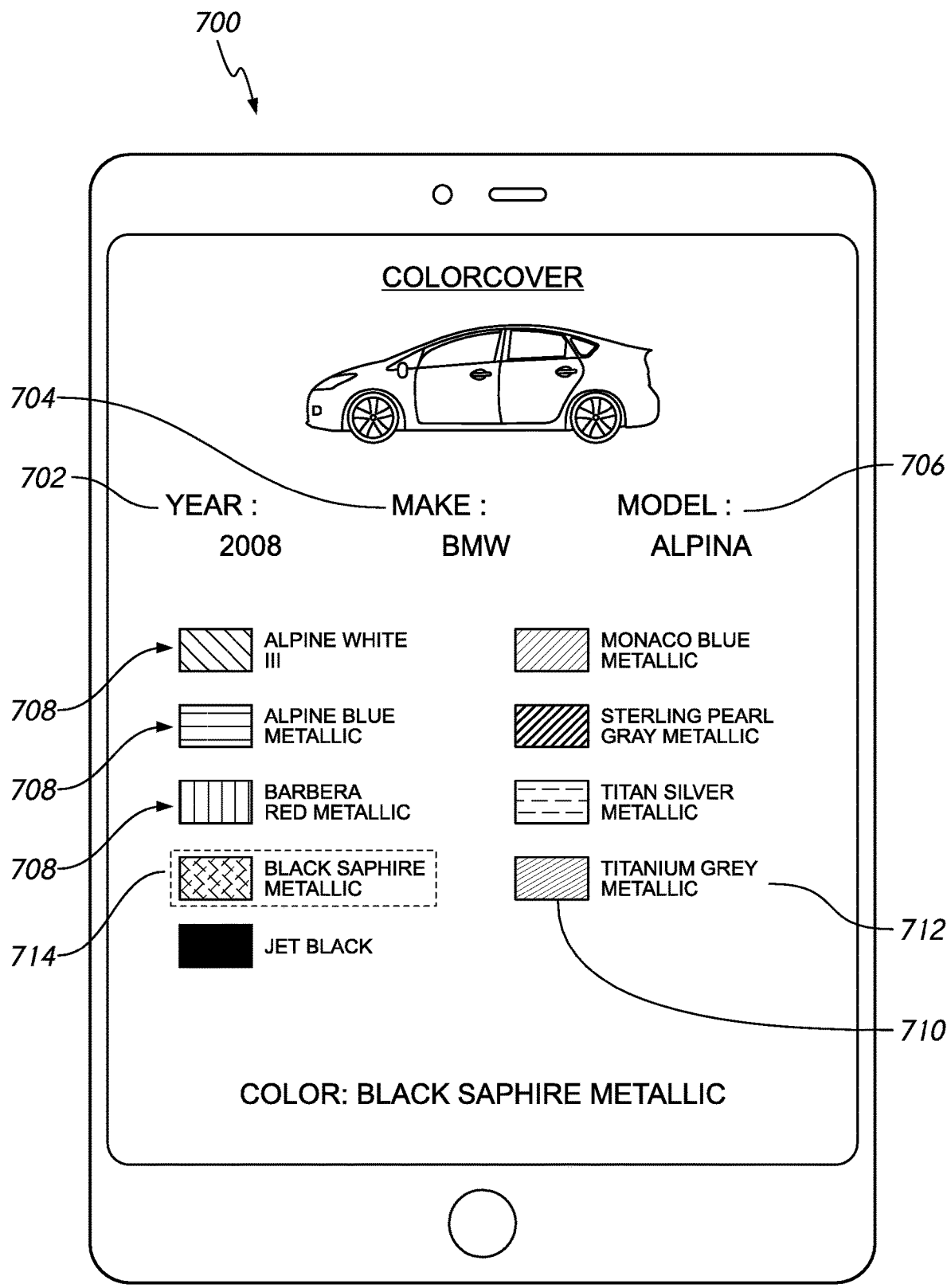
FIG. 16 shows one embodiment of a visual display on a hand-held device for a user to select a desired color from a list of vehicle colors for a particular year, make and model of vehicle.

FIG. 16 shows a screen 700 on a hand-held device for a user to select a desired color from a list of vehicle colors for a particular year, make and model of vehicle. In one embodiment, the hand-held device is a smartphone. In the example shown in FIG. 16, the vehicle's year 702 is 2008, its make 704 is BMW, and its model 706 is ALPINA. A total of nine colors 708 are shown as available options for this vehicle. For each color, a visual representation 710 of the color is preferably shown along with its corresponding name 712. From this list of colors, a user may select the correct color of his vehicle. Or, alternatively, the user may select a different desired color.

In one embodiment, application 66 on computer device 60 displays the list of colors on a display associated with computer device 60, allowing the user to select one by operating interface 74. In another embodiment, an app displays the list of colors on a smartphone screen and the user may touch the screen to select one. The application, or app, preferably highlights the color selected by the user in order to visually confirm the user's selection. In FIG. 16, for example, the color BLACK SAPHIRE METALLIC is highlighted 714 to indicate the user's selection of that color 614.

The user's selection of color 614 provides the desired color. The paint code corresponding to that color will be the desired paint code 616. The application, such as application 66, will thus have the desired paint code.

Figure 17:
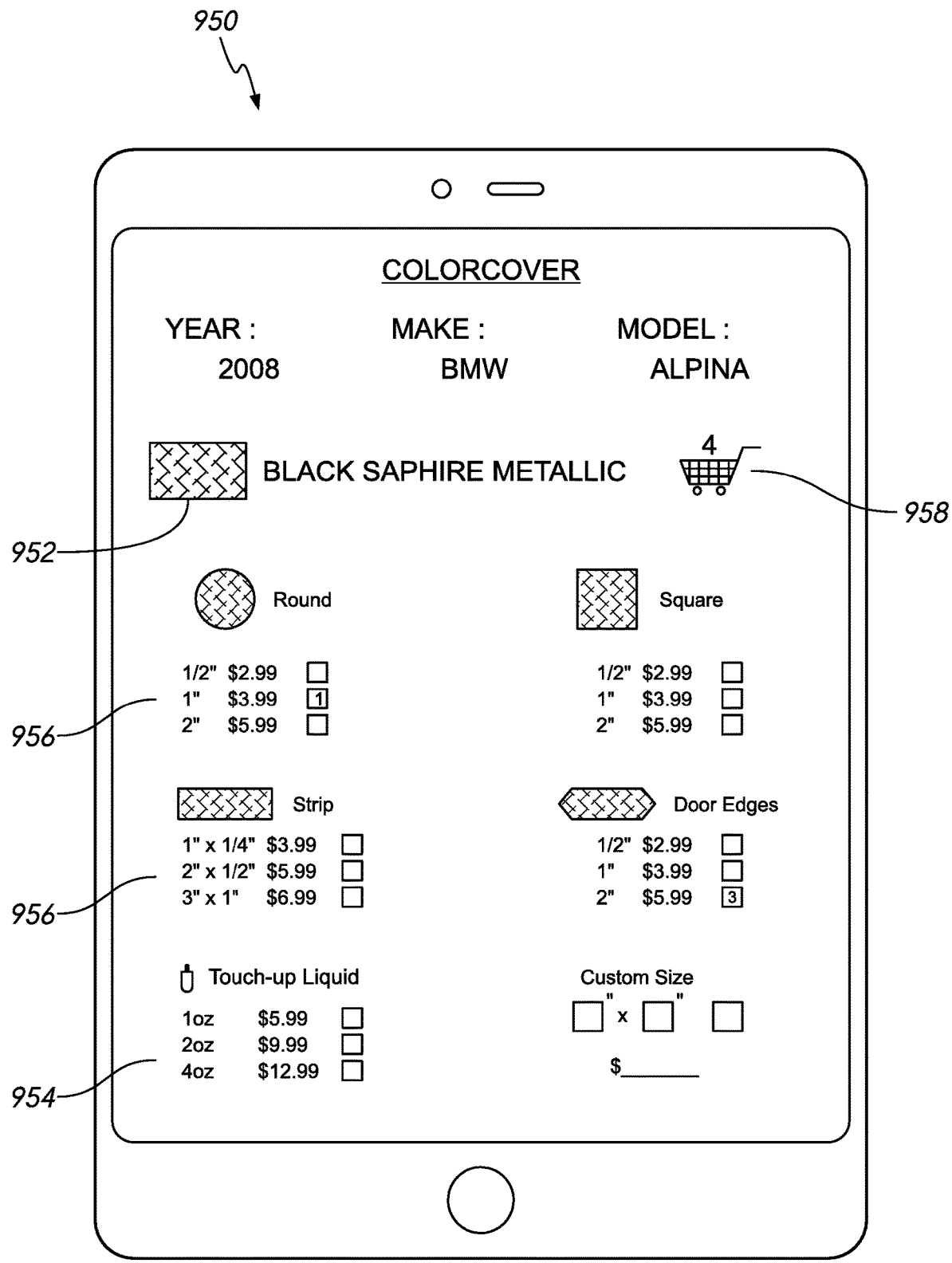
FIG. 17 shows a visual display on a hand-held device for a user to selectively purchase items corresponding to a particular paint code or color of a vehicle.

Once the desired paint code for the vehicle has been determined (160), the user may be provided a selectable option to buy products corresponding to that paint code (170). FIG. 17 shows a visual display 950 from an application or an app providing the user an option to selectively pick items corresponding to the determined paint code or color. In one embodiment, the color and its name are displayed 952 to serve as visual confirmation. Items such as a touch-up pen, touch-up liquid 954, and apparatus to conceal damage in the vehicle's paint 956 are available for purchase in this embodiment. In one embodiment, at least some of the apparatus to conceal damage in the vehicle's paint 956 is the same apparatus as disclosed in U.S. Pat. No. 9,993,994, which teaches an apparatus having two sides with adhesive on one side and a color on another side.

FIG. 17 shows a visual display on a hand-held device for a user to selectively purchase items corresponding to the determined paint code or color. As shown, the user may selectively pick items for purchase, and enter a quantity corresponding to the items being purchased. In one embodiment, a shopping cart display 958 may indicate a sum total of the number of items the user has entered for purchase.

Figure 18:
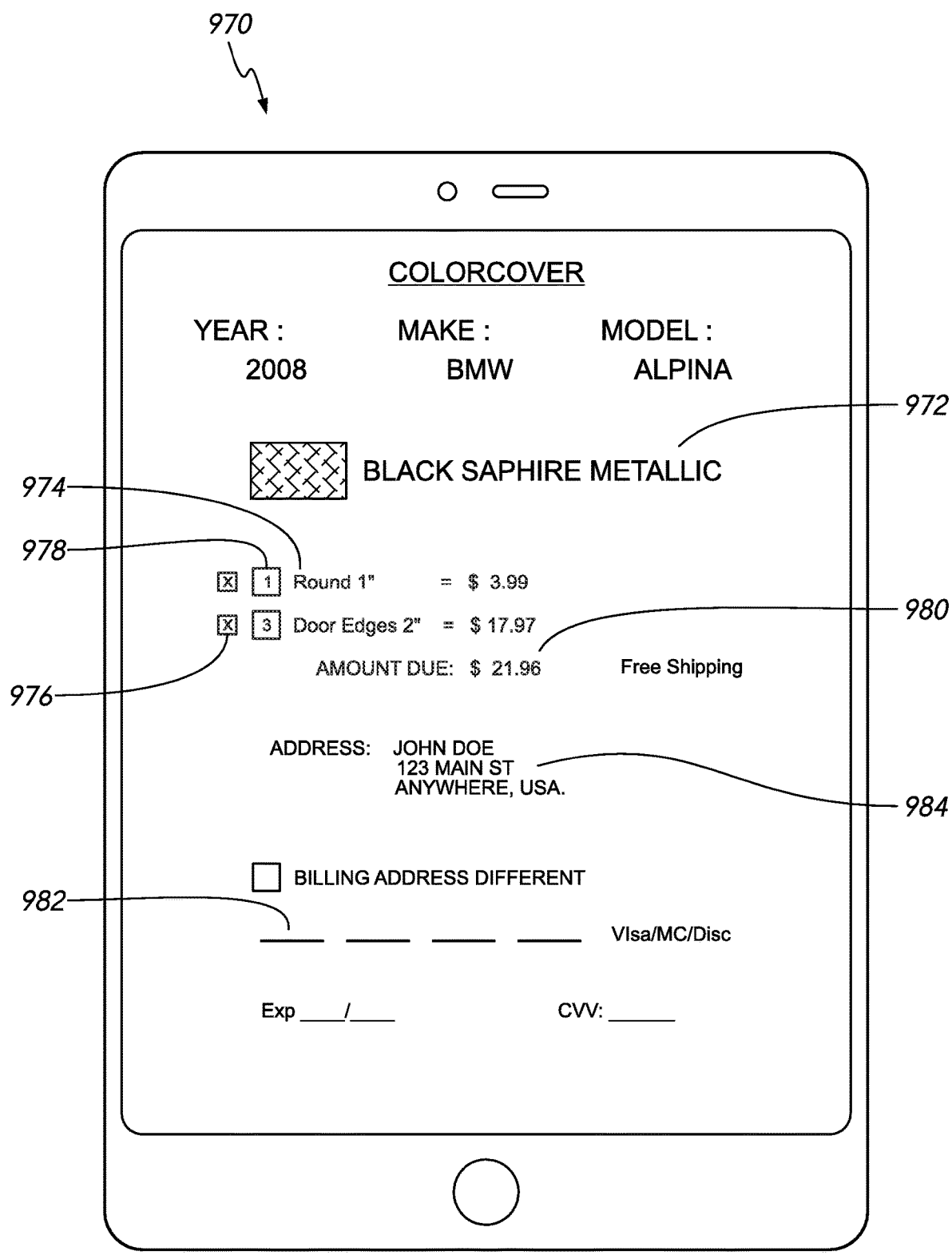
FIG. 18 shows a visual display on a hand-held device for processing a user's order and payment information.

If the user chooses to purchase products (170), the user's order and payment may be processed (180). FIG. 18 shows one embodiment of a visual display 970 on a hand-held device for processing a user's order and payment information. In one embodiment, the hand-held device is a smartphone. The color and the name of the color are displayed 972 to serve as confirmation of the vehicle's color for which the products are being purchased. The user may make payment arrangements as well as provide an address where the products are to be shipped. In one embodiment, multiple products may be ordered and shipped to multiple addresses. In one embodiment, the user's selected items and quantities are also listed 974 to confirm the products and quantities the user is purchasing. In the embodiment shown, the user may modify the order by, for example, deleting an item by selecting an 'X' 976 or by modifying the quantity 978. A total cost of the user's order 980 may also be displayed.

The user may pay for his order through customary credit card channels, customary alternate payment arrangements, and/or by charging to a mobile phone account. Display 970 allows the user to enter payment information 982 and a billing address 984.

Once the order and payment information have been processed (180), the order can be submitted to an order processing server for proper processing and fulfillment.

Although the methods and apparatus described above, including those corresponding to the flow charts and figures in this patent, have been described separately, it is anticipated that any of the methods disclosed can be implemented individually or combined in any combination. Any of the methods, apparatus, implementations, or procedures described herein can include machine-readable instructions for execution by: (A) one or more processors, (B) one or more controllers, and/or (C) any other suitable processing device. Any apparatus, software, or method disclosed herein can be embodied in software stored on a non-transitory tangible medium such as, for example, a flash memory, a CD-ROM, a floppy disk, a hard drive, a digital versatile disk DVD, or other memory devices. Persons of ordinary skill in the art will recognize that the entire method and/or parts thereof could alternatively be executed by a device other than a controller and/or embodied in firmware or dedicated hardware in a known manner e.g., it may be implemented by an application specific integrated circuit (ASIC), a programmable logic device (PLD), a field programmable logic device (FPLD), discrete logic, or the like.

Although specific methods and apparatus are described with reference to flowcharts depicted herein, persons of ordinary skill in the art should appreciate that many other methods of implementing machine readable instructions may alternatively be used. For example, the order of execution of the steps may be changed, and/or some of the steps described may be changed, eliminated, or combined.

The methods and algorithms illustrated and discussed herein may have various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules, units, or other components, can be combined or segregated as hardware and/or software stored on a non-transitory computer-readable medium as modules in any manner, and can be used separately or in combination.

The terms data storage device, data storage system, data storage means, and the like, are used to refer to a combination of computer hardware and computer software for storing data in a predetermined organized manner on a computer readable medium. Such medium may be associated with a data storage server, a computer device, or the like, with a combined purpose of storing data and providing appropriate data in response to queries received. Accordingly, the terms data storage device, data storage system, data storage means, and the like, may be used interchangeably and are to be understood to mean such combination of hardware and software.

Communications between computer devices and/or other components in the computerized systems and methods disclosed herein may be unidirectional or bidirectional electronic communication through wired or wireless means, configuration, or network. For example, one device or component may be wired or networked wirelessly directly or indirectly, through a third party intermediary, over the Internet, or otherwise with another component or device to enable communication between the components or devices.

Examples of wireless communications include, but are not limited to, radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, 4G network, and other communication networks known in the art.

In some of the embodiments described herein, the data storage systems and servers, including software therefor and the contents of the data storage systems, can be automatically updated and maintained by a third party to provide the latest processing capability as well as the latest data for vehicles, vehicle models, vehicle manufacturers, paint colors, and the like. Examples of data storage systems and servers include, but are not limited to, PCs, portable computers, shared servers available on a local or a wide area network, or accessible via the internet. The data storage systems may serve as a repository for data to be accessed or queried by other, unrelated, computer devices and computer systems as well. The data storage systems may be owned, operated and maintained by third parties and made available for commercial use at a cost.

Although the devices, systems, apparatus and methods have been described and illustrated in connection with certain embodiments, variations and modifications will be evident to those skilled in the art. Such variations and modifications may be made without departing from the spirit and scope of the disclosure, and are therefore anticipated. The description and teachings herein are thus not to be limited to the precise details of methodology or construction set forth herein because variations and modifications are intended to be within the spirit and scope of the present invention.

I claim:

1. A method for determining a vehicle's color, comprising:
   determining said vehicle's vehicle identification number;
   determining said vehicle's manufacture information;
   determining a paint code zone on a vehicle identification label for said vehicle based on said vehicle's manufacture information;
   if a paint code zone exists on said vehicle identification label, then:
      performing a zonal optical character recognition procedure on said vehicle identification label; and
      extracting a paint code in said paint code zone, wherein said paint code corresponds to said vehicle's color; or
   if a paint code zone does not exist on said vehicle identification label, then:
      determining a list of colors for said vehicle based on said vehicle's manufacture information; and
      selecting said vehicle's color from said list of colors.

2. The method for determining a vehicle's color of claim 1, wherein determining said vehicle identification number comprises:
   capturing an image of said vehicle identification label;
   receiving said image by an application on a computer device;
   performing an optical recognition procedure on said image; and
   determining said vehicle identification number from said optical recognition procedure.

3. The method for determining a vehicle's color of claim 2, wherein determining said vehicle identification number further comprises either:

scanning coded image information on said vehicle identification label and converting said coded image information to a string of characters, or extracting a string of characters imprinted on said vehicle identification label.

4. The method for determining a vehicle's color of claim 1, wherein said vehicle's manufacture information is determined based on predetermined digits in said vehicle identification number.

5. The method for determining a vehicle's color of claim 4, wherein:

said vehicle's manufacture information is determined by querying a data storage system, and said query is based on said predetermined digits in said vehicle identification number.

6. The method for determining a vehicle's paint color of claim 1, wherein said vehicle identification number is determined either by:

receiving the vehicle's vehicle identification number manually input by a user, or by performing an optical recognition procedure on said vehicle identification label.

7. The method for determining a vehicle's color of claim 1, further comprising:

providing a user a selectable option to buy one or more products corresponding to said vehicle's color, and processing an order and a payment if the user selects an option to buy said one or more products, wherein at least one of said products is either a touch-up pen, a touch-up liquid, or an apparatus having two sides with adhesive on one side and a color on another side.

8. The method for determining a vehicle's color of claim 1, further comprising:

capturing an image of said vehicle identification label with an image capturing device; and transferring said image to an application on a computer device, wherein said zonal optical character recognition procedure is performed on said image of said vehicle identification label.

9. The method for determining a vehicle's color of claim 8, wherein:

said computer device is a hand-held device, and said image capturing device is a camera in said hand-held device.

10. The method for determining a vehicle's color of claim 9, further comprising transferring said image to one or more other computer devices, wherein said zonal optical recognition procedure is performed by said one or more other computer devices.

11. A computerized system comprising:

one or more computer devices, said computer devices configured to be in data communication with each other;

said one or more computer devices each having a computer-readable storage medium comprising machine-readable instructions executable by a processor; and said one or more computer devices each having a processor configured to execute machine-readable instructions, wherein said machine-readable instructions are collectively configured to cause one or more of said computer devices to:

determine a vehicle's vehicle identification number;
determine a vehicle's manufacture information;
determine a paint code zone on a vehicle identification label for said vehicle based on said vehicle's manufacture information;

if a paint code zone exists on said vehicle identification label, then:

perform a zonal optical character recognition procedure on said vehicle identification label; and extract a paint code in said paint code zone; and if a paint code zone does not exist on said vehicle identification label, then:

determine said vehicle's color with a corresponding paint code from a list of colors for said vehicle, wherein said list of colors is determined from said vehicle's manufacture information.

12. The computerized system of claim 11, further comprising:

receiving an image of said vehicle identification label by an application on a computer device;

performing an optical recognition procedure on said image; and determining said vehicle identification number from said optical recognition procedure by either:

scanning coded image information on said vehicle identification label and converting said coded image information to a string of characters, or by extracting a string of characters imprinted on said vehicle identification label.

13. The computerized system of claim 11, wherein said machine-readable instructions are further collectively configured to cause said one or more computer devices to either:

receive said vehicle's manufacture information manually input by a user, or determine said vehicle's manufacture information by querying a data storage system, wherein said query is based on one or more characters in said vehicle identification number, and wherein said vehicle identification number is determined by either:

capturing an image of said vehicle identification label and performing an optical recognition procedure on said image, or by receiving said vehicle identification number manually input by a user.

14. The computerized system of claim 11, further comprising:

a first computer device, wherein said first computer device is a hand-held device or a personal computer; and a first set of machine-readable instructions stored on a first computer-readable storage medium associated with said first computer device, said first set of machine-readable instructions including an application, wherein an image of said vehicle identification label is captured by an image capturing device and is transferred to said application, and said zonal optical character recognition procedure is performed on said image of said vehicle identification label.

15. The computerized system of claim 14, wherein said first computer device is a hand-held device, and said image capturing device is a camera in said hand-held device.

16. The computerized system of claim 15, wherein said first set of machine-readable instructions are further configured to:

transfer said image from said application to a second computer device; and said zonal optical character recognition procedure is performed by said second computer device.

17. The computerized system of claim 11, wherein said machine-readable instructions are further collectively configured to cause one or more computer device to:
provide a user a selectable option to buy one or more products corresponding to said paint code; and
process an order and a payment if the user selects an option to buy one or more products, wherein
at least one of said one or more products is a touch-up pen, a touch-up paint, or an apparatus having two sides with adhesive on a first side and a color on a second side.

18. A method, comprising:
capturing an image of a vehicle's vehicle identification label with an image capturing device;
transferring said image to a non-transitory memory means in a computer device, said computer device having a processor and a means for storing computer-readable execution instructions;
performing an optical recognition procedure on said image;
determining said vehicle's vehicle identification number by either
extracting said vehicle identification number from said image by said optical recognition procedure, or by
receiving said vehicle identification number from a manual input by a user;
determining one or more items of the vehicle's manufacture information by either
querying a data storage means, said query based on one or more digits in said vehicle identification number, or by
receiving said one or more items of the vehicle's manufacture information from a manual input by a user;
determining a paint code zone on said vehicle identification label by querying a data storage means, said query based on said one or more items of the vehicle's manufacture information; and
determining a paint code of said vehicle by either
performing a zonal optical character recognition procedure on said image of the vehicle's vehicle identification label and extracting a paint code located in said paint code zone, or by
a user selecting a color with a corresponding paint code from a list of colors with corresponding paint codes for said vehicle.

19. The method of claim 18, further comprising:
providing a user a selectable option to buy products corresponding to said paint code, said products comprising either
a touch-up pen,
touch-up paint, or
an apparatus having two sides with adhesive on a first side and a color on a second side; and
processing an order and a payment if the user selects an option to buy a product.

20. The method of claim 19, further comprising performing a check to determine whether said vehicle identification number is valid, wherein
said computer device is a hand-held device, and said image capturing device is a camera in said hand-held device,
said one or more items of the vehicle's manufacture information comprise a year, make and model of the vehicle, and
extracting said vehicle identification number from said image comprises either:
scanning a coded image on said vehicle identification label and converting said coded image to a string of characters, or
extracting a string of characters imprinted on said vehicle identification label.

\* \* \* \* \*